(12) United States Patent
Hergenroeder

(10) Patent No.: US 10,957,325 B2
(45) Date of Patent: Mar. 23, 2021

(54) METHOD AND APPARATUS FOR SPEECH INTERACTION WITH CHILDREN

(71) Applicant: HELLO CLOVER, LLC, Houston, TX (US)

(72) Inventor: Alex Lauren Hergenroeder, Middleburg, VA (US)

(73) Assignee: HELLO CLOVER, LLC, Houston, TX (US)

(*) Notice: Subject to any disclaimer, the term of this patent is extended or adjusted under 35 U.S.C. 154(b) by 310 days.

(21) Appl. No.: 15/935,959

(22) Filed: Mar. 26, 2018

(65) Prior Publication Data

US 2018/0277117 A1 Sep. 27, 2018

Related U.S. Application Data

(63) Continuation-in-part of application No. 15/703,715, filed on Sep. 13, 2017.

(60) Provisional application No. 62/475,720, filed on Mar. 23, 2017.

(51) Int. Cl.
*G10L 15/26* (2006.01)
*G09B 19/04* (2006.01)
*G10L 15/07* (2013.01)
*G09B 5/04* (2006.01)
*G06F 3/01* (2006.01)
*G06K 9/00* (2006.01)
*G10L 25/48* (2013.01)

(52) U.S. Cl.
CPC .............. *G10L 15/26* (2013.01); *G06F 3/013* (2013.01); *G09B 5/04* (2013.01); *G09B 19/04* (2013.01); *G10L 15/07* (2013.01); *G06K 2009/00322* (2013.01); *G10L 25/48* (2013.01)

(58) Field of Classification Search
CPC .............................. G10L 15/265; G10L 15/26
USPC ........................................................... 434/365
See application file for complete search history.

(56) References Cited

U.S. PATENT DOCUMENTS 9,323,352 B1 4/2016 Haskin et al.
2009/0208913 A1 8/2009 Xu et al.
2010/0233662 A1 9/2010 Casper
(Continued)

FOREIGN PATENT DOCUMENTS

WO WO 2014/059416 A1 4/2014

OTHER PUBLICATIONS

Hill, "How Target Figured Out a Teen Girl Was Pregnant Before Her Father," https://www.forbes.com/sites/kashmirhill/2012/02/16/how-target-figured-out-a-teen-girl-was-pregnant-before-her-father-did/#5adf65836668, retrieved from the internet Apr. 28, 2019 (five (5) pages).

(Continued)

*Primary Examiner* — Kesha Frisby
(74) *Attorney, Agent, or Firm* — Orrick, Herrington & Sutcliffe LLP; Richard F. Martinelli; Wei-min Ning

(57) ABSTRACT

A method and apparatus for performing speech interaction with children is provided. The apparatus may be a computing device that includes at least one camera, at least one microphone, memory, and at least one processor for executing stored instructions. The at least one processor may be configured to determine an age range or an age or skill level of the child. The computing device may receive one or more inputs from the child. The at least one processor may perform analysis on the one or more inputs based at least in part on the determined age range or the age or the skill level of the child, and output a speech response to the child based on the performed analysis.

20 Claims, 8 Drawing Sheets

(56) References Cited

U.S. PATENT DOCUMENTS

2012/0295510 A1 11/2012 Boeckle
2016/0203832 A1 7/2016 Paul et al.

OTHER PUBLICATIONS

International Search Report (PCT/ISA/210) issued in PCT Application No. PCT/US2019/022881 dated May 23, 2019 (two (2) pages).
Written Opinion (PCT/ISA/237) issued in PCT Application No. PCT/US2019/022881 dated May 23, 2019 (eight (8) pages).
Katie, "Speech Development: Phonological Processes and Phonological Delay", Articulation & Phonology (AKA Speech Sounds), Speech & Language 101, Sep. 27, 2011, Swank Wordpress Theme by PDCD, http://www.playingwithwords365.com/phonological-processes-and-phonological-delay/.
Katie, "Articulation Development: What's Normal? (& What Isn't)", Articulation & Phonology (AKA Speech Sounds), Speech & Language 101, Sep. 25, 2011, Swank Wordpress Theme by PDCD, http://www.playingwithwords365.com/speech-articulation-development-whats-normal-what-isnt/.

METHOD AND APPARATUS FOR SPEECH INTERACTION WITH CHILDREN

CROSS REFERENCE TO RELATED APPLICATIONS

This application is a continuation-in-part of U.S. patent application Ser. No. 15/703,715 filed Sep. 13, 2017, which claims the benefit of U.S. Provisional Application No. 62/475,720 filed Mar. 23, 2017, the contents of which are incorporated herein by reference.

BACKGROUND AND SUMMARY OF INVENTION

This invention relates to a method, system, and apparatus for assisting in the education of individuals, particularly the education of children, including babies, toddlers, and children of varying ages. As directed to children, the present invention provides children with the sort of engaged, one-on-one responsiveness as well as speech recognition, interaction, and learning that is typically only available from an engaged, responsive adult.

The present invention provides technological interventions with information about the child's eye-gaze location, gesture activity, speech, vocalizations, emotional expression or other inputs. The disclosure further seeks to enhance learning by mimicking, for example, the parent's output of responsive and interactive speech, activities of physical gesture and of directed eye gaze or joint attention or otherwise to enhance the child's learning experience.

The present invention includes responses to inputs, either from a user (e.g., child, parent), other individuals, or, for example, information stored in memory. The present invention then processes, via a processor and associated memory, the inputs according to one or more computer program modules. Based on the input and computer program module(s), the present invention then presents an output, of various forms, to the user.

Inputs may take on various forms, such as, gestures, eye gaze, facial expressions, physical movements, emotional expressions, speech, vocalizations, or other sensory inputs. The method, system, and/or apparatus then interacts with one or more program modules to create outputs such as physical gestures, such as pointing, directed eye gaze, responsive speech interaction or other sensory outputs in a manner that assists the individual, for example, in a learning environment, for purposes of entertainment, or otherwise. Depending on the form of architecture, the appropriate input and output devices may also contain, as an example, cameras, microphones, speakers, and various devices to provide physical movement, such as an electro-mechanical pointing device, or pneumatically controlled movement device. By so doing the present invention reacts with companionship and, in certain cases, physicality to aid in an individual's education. This invention relates to having a contingent response that mimics traditional methods by which an individual may learn, and that may include a physical interaction with the child.

The present invention is also beneficial to parents and to researchers because it is easy to update the device with a module or modules that contain best practices and interventions from the latest academic research. In this way, the device is able to quickly and consistently disseminate best practices discovered by early childhood education researchers to all children with access to the device. This is a tremendous advantage over the current system of gradually disseminating information about best practices through a variety of networks over the course of many years and in some cases over the course of many decades.

Moreover, currently existing voice interaction technology, for instance, is limited to the interaction between an adult user and a computing device. In at least that regard, the present invention is also advantageous in that sophisticated and dynamic speech interaction between a child and the computing device is possible with the added benefit of at least helping the child learn vocabulary, pronouncing various sounds and words, developing speech and language skills and more, as will be further described below.

Because it can be very difficult to educate every parent about the latest in early childhood education research, parents and even preschool teachers may not be aware of the best practices discovered by academic researchers until many years have passed. In the intervening time children will have failed to reap the benefit of the academic research because it had not yet become widely known to all parents.

Furthermore, even when best practices from academic research reach parents the best practices may be confusing to implement or may involve changing the daily habits of parents or preschool teachers. As a result of the difficulty of changing habits and the difficulty of reaching parents with news of new research, many helpful best practices do not make their way to the parents or children who need them, or are not implemented consistently because consistent implementation, while beneficial, involves the difficult process of changing human behaviors.

The present invention helps resolve these issues. When a new discovery is made in educational academic research, the behavior of the device can be immediately updated through a simple software or module update and immediately, consistently, and precisely follow the best practice generated in a lab but in households and day-cares across the country. A benefit of the device is its ability to consistently, precisely, conveniently, and immediately follow the best practices of academic researchers through simple software or module updates. The benefit provided by this device of being able to implement interventions at scale with consistency and immediacy is tremendously advantageous to researchers, children, and parents.

Prior to the present invention, it could take years or even decades for best practices discovered by academics to reach parents and children. This long path to broad implementation typically involved lengthy and sustained public relations efforts and the lengthy process of people changing habits over time. With this device, best practices from researchers can be precisely implemented on a large scale with immediate effect, via easy updates to the processing modules.

For example, the research of Harvard Professor Meredith Rowe indicates that it is extremely important for parents to use gesture when interacting with babies and infants. Specifically, Professor Rowe of Harvard found that when parents gesture more, children gesture more and children who gesture more have higher vocabularies independent of IQ. Rowe, M. L., S Ozcaliskan, and S. Goldin-Meadow, 2008, "Learning Words by Hand: Gestures Role in Predicting Vocabulary Development," First Language (2): 182-199. As the research found, higher vocabulary in early childhood is the best predictor of later academic and life success and this simple intervention of gesturing more increases vocabulary regardless of the child's IQ. Thus, the present invention is capable of gesturing and labeling in such a way that should increase children's use of gesture and thereby increase their vocabularies and likelihood of academic success.

High quality talk means different things at different stages of early childhood. Specifically, high quality talk for infants and babies means talk with gestures and lots of different physical objects. High quality talk with toddlers means introducing and responsively explaining sophisticated and unusual vocabulary words. High quality talk for toddlers and preschool-aged children means engaging in decontextualized talk or talk about the past or future. It is difficult for any parent to understand and implement in their day to day routines with their children, but through the present invention a high quantity of high quality of talk specific to the child's developmental stage is easy to incorporate into a family's daily routine. For instance, when the child is an infant or baby, the present invention uses its capability to gesture in combination with its eye-gaze tracking, facial expression tracking, and gesture tracking, and object recognition to consistently incorporate gesture and labeling into the baby or infants day to day play. As the child becomes a toddler, the present invention is aware of the unusual and sophisticated vocabulary that is most helpful for the child to learn and is able to remember to introduce unusual and sophisticated vocabulary as part of the child's daily play, including through reading books that are known to the present invention to contain unusual or sophisticated vocabulary. Later, as the child becomes a preschooler the present invention, using a three-dimensional physical presence can join the family at the dinner table or the breakfast table and engage in conversation with the child about past or future events. Parents and other family members can join in the conversation. In this way the present invention is engaging the family in best practices from researchers in a seamless and convenient fashion. Overall, the present invention's gesture and responsiveness make it an ideal tool for researchers and parents to work together to help children learn effectively in early childhood Other objects and advantages of the invention will be apparent from the following detailed description of non-limiting examples of the invention.

DETAILED DESCRIPTION OF THE EMBODIMENTS OF THE INVENTION

Figure 1:
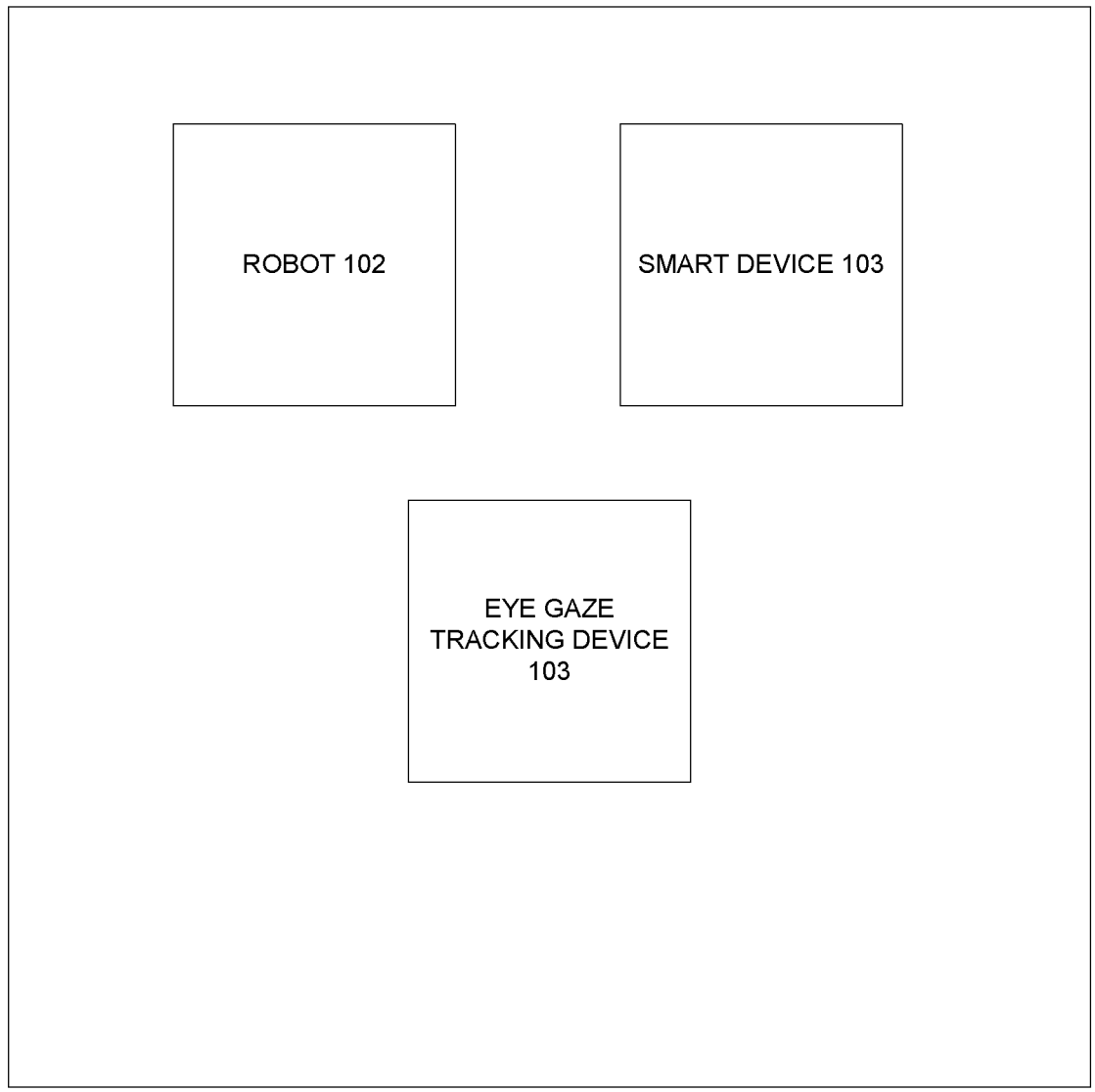
FIG. 1 is a representation of an embodiment of a physical configuration of the present device.

This disclosure describes a method, system, and/or apparatus to provide assistance to an individual who is learning, e.g., learning how to speak a language. While throughout this description reference will be made to a child as the individual who is undertaking the learning experience, it is understood that the invention is not limited to education of children and can be used to enhance the learning of any individual.

The method, system, and/or apparatus of the present invention interacts with and teaches children in the same manner as they are taught by humans, but with the benefits provided by a system using one or more program modules. The device receives input from a child in various forms, including physical movements, facial expressions, verbal, such as speech or vocalizations, or other aural expressions. The architecture and techniques of the present invention responds to the child's inputs with, after processing, various outputs appropriate and responsive to the learning environment, including physical gestures, and audio or video responses. In this way the method, system, and/or apparatus of the present invention are able to mimic the typical adult-child learning interaction.

Because very young children have limited language abilities, adults tend to get their information about what is interesting to the child in four forms: where the child is looking; where the child is gesturing (what the child is pointing at, what the child is putting in his or her mouth, what the child is grabbing, any attempts at sign language, etc.); the child's facial expression and/or posture; the child's vocal output (although this may not be in the form of words but may be grunting, crying, giggling, babbling, or, indeed, speech of varying degrees of proficiency) and the sound of the output (variation in pitch, tone, speed, etc.).

Similarly, due to the child's lack of ability to understand language consistently, the adults in the child's life will often supplement vocalized statements with gestures and/or the use of directed eye gaze in order to convey meaning to the child. Physical gestures oftentimes improve a learning environment, with the child learning more than just receiving a passive, non-physical response from a learning device. Directed eye gaze takes many forms but there are two particularly helpful examples. In one example, the adult looks where he or she wants the child to look in order to draw the child's attention to a particular area of focus. In another example, the adult looks at the child and then looks where he or she wants the child to look. In both examples the directed eye gaze helps the child understand what is important in his or her environment at that moment in time.

The present invention brings technological interventions in early childhood education closer to this responsive parent-child interaction by providing technological interventions with information received from the child, including eye-gaze location, gesture activity, speech, vocalization, and emotional expression. The disclosure further seeks to enhance learning by mimicking the parent's activities of physical gesture and of directed eye gaze or joint attention to enhance the child's learning experience. In another example, the disclosure seeks to enhance speech interaction with the child in a sophisticated manner, for instance, deciphering and/or determining what the child is attempting to communicate or is communicating based on various types of information (e.g., common errors known in childhood speech development, speech data acquired over time, contextual data, etc.), and thus, allowing the present invention to verbally respond to the child in a manner similar to how a parent would respond, thereby being able to progressively teach the child vocabulary over multiple speech interactions. In addition, the present invention may use "motherese" to enhance the learning environment. "Motherese" is high-pitched, cooing speech that may include the repetition and hyperarticulation.

The present invention utilizes any type of exterior device that can be used to assist in learning. For example, an apparatus of the present invention may include of a tablet computer, a desktop computer, or a mobile computer device. In turn, the computer can be incorporated into devices familiar to a child, such as a stuffed toy or robot. In addition, the present invention can take on a form that is easily configurable, such as a device that can attach to a child's playpen, or the back of a car seat. When configured in this manner, the present invention can be used in any location, to provide an educational environment for the child in a manner that is transportable, portable, and that can readily be transferred or carried to any location, such as in an education center or any learning environment. Moreover, the present invention may be distributed based on a subscription model or the like.

The present invention can also take on a component form, where the various input, one or more program modules, and output may be in one or more separate devices. For example, the program module, video, and audio components may exist on a portable computing device such as a tablet computer (e.g., Amazon Fire, Android tablets, iPad), while a separate component connected to the tablet computer may include an eye gaze tracker device and a physical gesture device (such as a movable arm).

There are various areas in which the present invention can be used within a learning environment, examples of which are described below. However, these examples are not meant to be limited or otherwise define in isolation the scope of the claimed subject matter, and are used for showing different embodiments without limitation.

In one embodiment, the present invention leads an interactive lesson with the child, such as reading a book. When reading a book to a child, an engaged parent usually does not simply read the text of the picture book, but instead reads the text, then notices which parts of the pictures on the page are drawing the interest of the child and then provides a contingent response or comment about those areas of interest. A parent reading a page in a book about ducks would read the text and then note that the child is looking at a specific duck. The parent would then point to the duck picture (and perhaps look at the child and then at the duck picture) and say "Do you see the duck? This is the duck. The duck is splashing." As the child becomes older and more advanced the parent may point to the picture of the duck and look at the picture of the duck and then look at the child and say "What is this?" The child would then respond that this is the duck. The parent might then point to what the duck is doing and say "What is the duck doing?" and the child would respond that the duck is splashing. In both instances pointing and directed eye gaze are helpful, even invaluable, tools to enable the parent and child communicate effectively. The critical point is that reading a picture book to a young child is not simply reading text but actively noticing the pictures that draw the interest of the child and through gesture (pointing, etc.) and informational commentary or back and forth questioning educating the child about the pictures in a responsive, engaging manner. The parent is responsive in the moment of interaction with the child, and that responsiveness leads to better learning outcomes.

The present invention would operate in a manner to provide the responsiveness from an adult in an educational environment to enhance the learning process.

For example, the present invention would read to the child by transmitting to the child both an audio output of the words of the book, as well as utilizing a physical pointing device to point to certain pictures in the book to highlight vocabulary words, or, as a child grows older, ask the child critical thinking questions. While the present invention would follow a lesson plan in much the same way a teacher would follow a lesson plan, the present invention remains responsive to the child throughout the lesson. For example, the present invention would constantly scan the facial expression, body movements, eye gaze, vocalizations, and gestures of the child. If the present invention notices that the child is becoming fidgety or looking away, the present invention might ask the child a question or point out something of interest to the child in order to reengage the child in learning the material. Alternatively, the present invention might notice that the child is pointing at a duck on a page, or gazing intently at a particular duck on the page. Noticing this, the present invention would pause reading to point to the duck as well and say, for example, "It's a duck" several times to help the child understand that the item he is gazing and pointing at is something called a "duck." Again, the present invention is utilizing its eye gaze, three-dimensional pointing/gesture, and responsiveness abilities to keep the child engaged and to help the child learn in the same way that a caring teacher or parent would help the child learn and keep the child engaged.

In another embodiment, the child would engage the present invention in purely child-lead play. In this scenario the child plays as he or she desires and the present invention is responsive to the child in the same manner as a parent or other adult caregiver. For example, a child named James might decide that he would like to practice reading to the apparatus. The present invention would work with James— for example, as a stuffed toy located near James. The present invention will listen to James read and when James comes to a difficult word, the present invention would register that James is struggling with the word via inputs from James' vocalizations, gestures, eye-gaze, and facial expressions, and the present invention would provide assistance by pronouncing the word for James.

Alternatively, a baby, Julia, might decide that right now she wants to play with her small zoo toys and present invention (in whatever form it takes). In this case Julia might hold her toy tiger and wave it around in front of the present invention. The present invention would then respond by looking and pointing at the toy tiger and saying "It's the tiger". Julia might repeat this several times with several different animals. In each case, Julia is gaining exposure to new vocabulary words in the same way that she would if she were playing with her parents, namely, the apparatus is responding to Julia's gestures with directed eye gaze, gesture, and an encouraging verbal response. In another scenario, Julia might decide that she is going to giggle and dance. The present invention would narrate Julia's activities in an encouraging fashion by saying "Look at you Julia! Are you dancing and giggling? Yes, you are!" looking at Julia. Again, the present invention is exposing Julia to relevant vocabulary in a responsive, relevant, encouraging fashion.

It is beneficial to provide the child with the type of responsive interactions and child-lead interactions that are valuable in parent-child interactions. It is also beneficial to provide non-verbal cues to help children understand what is being said and what object is being discussed. Specifically, it is beneficial for an educational device to be able to gesture and especially to be able to "point" to an object the way a parent would point to an object to understand which object or picture is being discussed. It is also beneficial for an educational device to be able to use eye-gaze both to draw the attention of the child by looking at the child and then to draw the child's attention to a specific object to help the child who is still a language learner to understand that the object being discussed is the object at which the parent has directed his or her gaze.

While some children will simply gaze at an object of interest to elicit a response from a caregiver, other children will gesture or point to the object of interest. Still other children will gesture while looking back and forth from the parent to the object of interest and vocalizing. Each child is different and children may even use different techniques at different times depending on the adult with whom they are interacting or the child's level of interest in the object. Typically, drawing the attention of the adult involves some combination of gesturing, eye-gaze, and vocalization.

Referring back to the aforementioned example of a parent reading to the child: when reading a book to a child an engaged parent does not simply read the text of the picture book but instead reads the text, then notices which parts of the pictures on the page are drawing the interest of the child, and then provides a contingent response or comment about those areas of interest. The parent may identify this area of interest simply by noticing which parts of the page the child is looking at, however, they may also notice that the child is pointing to specific areas of the picture on the page. When a child points he or she is said to be gesturing or engaging in gesture. This is another way that children let parents know what has drawn their interest. A responsive parent will both encourage this behavior and be sure to provide the information the child is seeking, preferably in motherese if the child is very young.

This active noticing of the child's area of interest also occurs outside of the context of reading to children. Specifically, when playing or interacting with a child an engaged, responsive parent will notice the objects that draw the interest of the child and provide a contingent response educating the child about the objects. This typically occurs in one of several ways: either the child gazes or looks at an object and the parent notices this gaze; or the child gestures to an object (gestures to an object by pointing at the object, grabbing the object, waving the object around, giving the object to the adult, engaging in giving and receiving of the object with the adult, grabbing the object and placing it in front of the adult, mouthing the object or putting the object in his or her mouth, etc.); the child engages in both gazing at the object (or back and forth between the object and the adult) and also gesturing to the object of interest, potentially vocalizing at the same time. An engaged, responsive adult will notice these behaviors and provide a contingent response about the object.

For example, the child is looking at a toy tiger. The adult notices that the child is looking at the toy tiger. The engaged, responsive adult then responds by looking at the toy tiger (or back and forth at the toy tiger and at the child potentially while pointing at the toy tiger) and saying "It's the tiger. The tiger goes roar!" In another instance the child might gesture to the toy tiger by putting the toy tiger in her mouth. The engaged, responsive adult notices this behavior and responds "Look at you! You've got the tiger. That's the tiger. Yes, it is! It's the tiger!" In yet another example we imagine that the child gestures to the toy tiger by pointing to the toy tiger and looking back and forth at the toy tiger and the adult. The engaged adult notices where the child is gesturing and looking and then provides the informational contingent response "It's the tiger!"

This gesture and contingent response is an important part of how children learn about their world. In this process it is helpful to notice where the child is looking and/or gesturing. Each child is unique. Some children will rely more heavily on gesture to elicit information about their world. Other children will tend to elicit information by gazing at an object and/or gazing at an object and then making eye contact with a parent who then provides a contingent response. Still other children will engage in both behaviors simultaneously while also vocalizing to draw the attention of the parent. In order to provide an enriching educational experience that mimics this eye-gaze, gesture, contingent response process it is helpful to have information about where the child is looking and/or where the child is gesturing in order to provide the sort of engaged response that an engaged, responsive parent would provide.

While data on where the child is looking is helpful in order to create the appropriate contingent response, it also allows the present invention to fashion an appropriate output, in the form, for example, of audio, visual, virtual reality, augmented reality, and/or gestural response to the child's area of interest. The present invention determines where it should respond to invoke the salient stimuli in the environment to provide a response.

The present invention may also be used to assist an individual in reading aloud without judgment from a human monitor. Learning how to read and practicing reading out loud can be a stressful and intimidating activity. Reading aloud to a device according to the present invention, particularly when it is in the form of a toy, stuffed animal, or animatronic robot, can be a helpful way for new or struggling readers to get invaluable reading practice without the anxiety of reading in front of peers or adults. Eye-gaze tracking data would provide the present invention with the data necessary to look at the right word (the right location in the book where the child is currently reading) in order to "follow along."

Without eye gaze tracking, data on what, in the environment, the present invention should analyze might otherwise be difficult to come by accurately in real time, especially if new readers skip words or have difficulty with enunciation. The eye-gaze information would also provide information on specific points in the text where the child is struggling (or is staring for some time before pronouncing a word) and where it might be helpful to provide assistance to the child by pointing to the word that the child is struggling with and helping the child sound out the word phonetically or with other teaching techniques. A device of the present invention might then make note of the words with which the child struggles and incorporate them into flashcards for the child or provide this feedback to a teacher or parent so that teachers and parents know where to focus their own efforts. The individualized data from this process could be very helpful to both parents and teachers in providing individualized lessons for the child to target problem areas, suggest more advanced material for readers who are doing well, and also potentially provide timely detection of signs of learning differences. The grace of the system is that the data is acquired with minimal effort and paperwork on the part of the teachers and parents. This could be helpful, especially in schools with larger class size and limited resources where it can be difficult to provide one-on-one attention to all students and where there is the risk of students falling behind or learning differences going unnoticed or unsupported.

The eye-gaze tracking data is of additional value in this scenario when a child might deliberately skip a difficult word or when a child might accidentally skip words simply because he or she is new to reading. If a device were simply attempting to match the audio of the child reading aloud with the text of the book, then the device would likely produce errors when the child skips words, especially if the child's enunciation is unclear as is the case for many young readers. However, with the addition of the eye-tracking data the device will have the information that the child moved past the difficult word and has moved on in the sentence, decreasing the likelihood of program error.

Whether it is in the aforementioned examples discussed above or in other further examples in accordance with one or more aspects of the present invention, the ability to perform sophisticated speech interaction with the child is important in order to, for example, understand what the child is saying and respond appropriately. As will be further discussed below, determining or deciphering what the child is saying may be based one or more different types of data and/or information (e.g., data that the present invention is receiving in real-time, data that has been stored, analyzed, and/or trained over time, data received from other computing devices and networks, other types of data related to speech development for children at various ages).

The present invention takes into account these factors to provide a method and apparatus that enhances a child's learning experience. The architecture and techniques of the present invention accepts inputs from the child, processes those inputs, and provides outputs back to the child to provide an interactive learning environment.

As shown in diagram form in FIG. 1, the physical configuration of present invention may take on many different forms. For example, a device of the present invention 101 may take the form of a robot 102. In some implementations the robot contains robotic features such as "eyes" that look in different directions, and/or facial movements that may be controlled via a signal from a CPU and/or computer to one or motors in the robot that controls its expressions. For example, in some implementations the robot would move along a track via step-motor and/or electric motor and/or hydraulic motor and/or a pneumatic system after receiving the signal to move from a computer, CPU or other device. As can be appreciated by those of skill in the art, in some implementations the robot may contain one or multiple figures and/or "hands" and/or pointing object and/or objects and/or anthropomorphic figures and/or zoomorphic figures and/or robotic figures with parts that move via step-motor and/or electric motor and/or hydraulic motor and/or pneumatic system after receiving signal to move from computer, CPU, or other device. In some implementations the figures may include moving parts, such as "arms" or "hands" that move to point in different directions such as pointing at a part of a book in front of the robot or at a toy in front of the robot that the child would like to have identified and discussed; the robot may also include moving parts such as moving "eyes" that move to "look" at a specific part of a book in front of the robot or at a toy in front of the robot that the child would like to have identified and discussed.

The movement of the robot is controlled via computer (and/or CPU or other device) and accomplished via step motor and/or electric motor, and/or hydraulic motor and/or pneumatic system. The signal from the computer (and/or CPU and/or other device) in any of these cases could be received from a proper computer, and/or from a CPU in the robot, and/or from a tablet and/or from a smartphone and/or from a smart device and/or from another robot, and/or from the CPU of the robot itself and/or from the computer of the robot itself.

The signal may be received via any known technology, such as through a connecting cable, through wireless technology via a wireless adapter, through Bluetooth technology via a Bluetooth RF transceiver, or through a specific network system such as Apple's Airplay system, and/or through USB cable connection and/or through lightning port cable connection.

The robotic elements, or objects or figures that move, vocalize, point, "look," mimic a facial expression, and engage in other gestures (on command from the CPU and/or tablet and/or computer and/or smartphone) to help children, especially very young children, understand what they are seeing. For example, the direction of the "eyes" and the gesture of the "arms" of the robot mimic the eye-gaze and gestures of responsive adults. For example, the robot's arm would move to point to a toy sailboat while the computer announced "This is a sailboat" and so forth. The robot may contain one or multiple cameras facing the screen of the computer and/or television and/or one or multiple cameras facing the child/facing out and/or one or multiple speakers and/or one or multiple microphones and/or one or multiple wireless adapters and/or one or multiple Bluetooth receivers and/or one or multiple USB cable connections to other devices. In some implementations the robotic figure may contain a "head" that is actually a touchscreen and/or screen and/or smart device and may be able to, for example, conduct video messaging where, for example, a parent's face would be displayed on the screen of the "head" of the robot when the parent calls via video chat, or where a graphic or video of a character might explain the content of the book would be displayed on the screen "head" of the robot. In some implementations the robot may hold or contain one or multiple touchscreen devices and/or smart devices and/or smartphones and/or one or multiple computers and/or one or multiple tablets.

For example, the present invention may be in the form of a smartphone, tablet, computer, or smart device 103 with one or multiple cameras or simply one or multiple cameras in a wand/or faux smartphone, tray, box, or other such toy that is connected to a smartphone, tablet, computer, or smart device where the child can take a picture of an object. The device then uses object recognition technology to identify the object the child photographed and to provide an audio, visual, or gestural response that tells the child about the object. As an alternative, the device then uses optical character recognition (OCR) technology, optical word recognition technology, intelligent character recognition (ICR) technology, intelligent word recognition (IWR) technology to read a typed or handwritten label on an object such as a toy and to provide an audio, visual, or robotic response that tells the child about the object.

Or, the present invention may be in the form of a smartphone, tablet, computer, or smart device with one or multiple RFID or sensor readers or simply one or multiple RFID or sensor readers in a wand or faux smartphone, or tray, or box, or other such toy that is connected to a smartphone, tablet, computer, or smart device where the child can present the object of interest to the device. The device then scans the RFID or other sensor and provides an audio, visual, or robotic response that tells the child about the object. The device can then use RFID or sensor readers, object recognition, optical character recognition (OCR) technology, optical word recognition technology, intelligent character recognition (ICR) technology, intelligent word recognition (IWR) to identify the object or picture or item of interest to the child and to provide an appropriate audio, visual, or robotic response for example a response that tells the child about the object or about the part of the picture-book that was of interest to the child.

Another form of the present invention is an eye gaze tracking device 104 either in the form of one or multiple cameras pointed at the child collecting data about where the child is looking or infrared eye gaze tracking or infrared or camera-based eye gaze tracking in a device such as goggles or glasses worn by the child. Such goggles or glasses may also include one or multiple cameras facing outward from the child to capture information about the world around the child and/or about what the child is seeing. The eyegaze tracking devices may be embedded in or connected to a smartphone, tablet, computer, smart device, home device, or robot through Bluetooth, Wi-Fi, or a physical connection such as USB, Ethernet, etc. Through this connection the device receives information about where the child is looking and through this information what is of interest to the child.

As can be appreciated by the above example, the form of the method and apparatus of the present invention can vary depending on the learning environment. The input, one or more program modules, and output may all take on different forms to perform different functions associated with the learning environment.

Figure 2A:
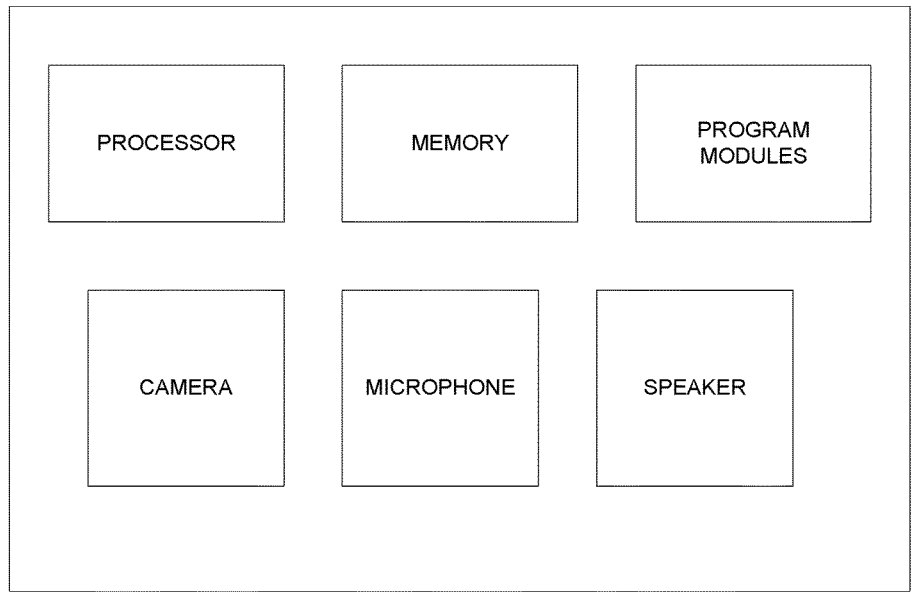
FIGS. 2A and 2B are representations of embodiments of the present invention.

As shown in FIG. 2A, one embodiment as a device has a processor; a memory accessible by the processor, the memory storing one or more program modules executable by the processor; a camera; a microphone; a speaker; where the one or more program modules is capable of receiving audio data from the microphone and recognize the speech associated with a particular user of the device based on received audio data; where the one or more program modules, when executed by the processor, is capable of receiving video data from the camera sufficient to determine the direction of eye gaze of a particular user of the device based on the received video data; and where the program modules are capable of causing audio information to be transmitted from the speakers the computing device.

While FIG. 2A shows one of each of the depicted components of the device, it may be understood that the device may include multiple components (e.g., at least one processor, at least one memory, at least one camera, at least one microphone, at least one speaker). The processor shown in FIG. 2A may be a standard processor, such as a central processing unit (CPU), or may be a dedicated processor, such as an application-specific integrated circuit (ASIC) or a field programmable gate array (FPGA), and the processor may instruct the various components of the device to perform various tasks based on the processing of the information and/or data stored in memory or in accordance with the one or more program modules. It is understood that one or more program modules is synonymous with one or more executable instructions (e.g., software) or otherwise that can be executed by the processor and the one or more program modules may be stored in memory or any other storage device. Furthermore, the device itself may be any type of device capable of performing the one or more aspects of the present invention, such as a computer, mobile computer, laptop, tablet computer, wearable computer, smartphone, Ultrabook, PDA, etc.

Figure 2B:
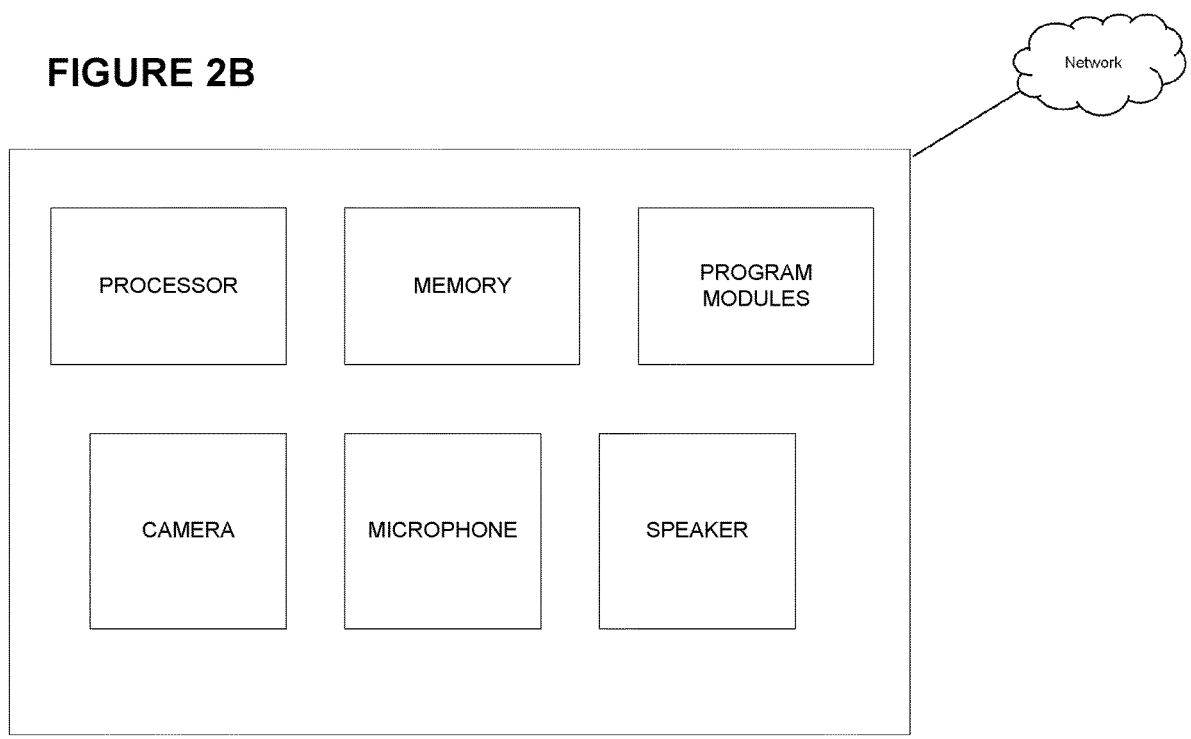

FIG. 2B illustrates a device that is similar or identical to the device shown in FIG. 2A, except FIG. 2B shows the device connected to a network, which may be used to communicate with other computing devices, such as devices similar to the devices of FIGS. 2A and 2B, other type of computers, such as mobile computers, server computers, databases, cloud computers, laptop computers, tablet computers, wearable computers, smartphones, etc. It is understood that the term "network" broadly encompasses all types of networks, including but not limited to one or more of the following: Internet networks, Local Area Networks (LANs), Wide Area Networks (WANs), cloud computing networks, telecommunication networks, and the like. As such, the device may be able to transmit and receive information used for speech recognition and interaction with children from other computing devices over the network.

As shown in FIG. 2A, an input device may include a gesture tracker, where a video camera of the present invention monitors and tracks the physical gestures of the child. The video camera may also be configured to recognize facial expressions of the user. The method and apparatus of the present invention may include a touch pad device for input, in place of or in addition to other input devices. The input device may include a sensor device which may, for example, track the movement of a user's body, including arms, legs, and head. The input device may constitute a passive RFID device to read information from an associated RFID transmitting device used by the user, or in the proximity of the user.

As will be understood by those skilled in the art, the exact input devices utilized by the present invention may vary.

For example, in some implementations a device of the present invention may contain an eye-gaze tracker that is an infrared or near-infrared tracker. The eye-gaze tracker may have one or multiple cameras, or may be in the form of goggles, glasses, or other headwear containing cameras and/or infrared and/or near-infrared tracking.

In some implementations a device of the present invention may contain one or multiple cameras facing the child and/or children and/or robot and/or robots to track the child and/or children's facial expressions, gestures, activities, and like information. In other implementations the device may contain a mask with one or multiple sensors that registers the facial expressions and facial movements of the child and that transmits this data for processing. In still other implementations the device may contain one or multiple cameras on a clip on the child's clothing and/or on goggles or glasses worn by the child, and/or on head gear for the child and/or in a robot facing the child and/or one or multiple cameras facing forward from the child capturing what the child sees and/or what is happening in the child's environment and/or one or multiple cameras in stands or objects near the child where the camera data is transmitted by the appropriate means.

The present invention may also include conductive surfaces such that the conductive surface when placed on a touchscreen device acts as a code for an application running on the touchscreen device. For example, a plastic, three dimensional toy letter in the shape of the letter "A" where one side of the letter is made of conductive material and the letter toy contains either a battery or other conductor or is designed so that when the letter is being held the electricity from the human hand is conducted via the letter, then when the conductive letter is placed on a touchscreen the touchscreen device reads the shape of the letter A and then an application might use that information to provide an audio output about words that start with the letter "A" or even simply to provide audio output that says "This is the letter 'A'!" Similarly, a set of plastic toy animal figures might be designed where the bottom of each toy animal is both conductive and a unique shape such that when the toy animal tiger is placed on the touchscreen an application on the touchscreen device will be able to identify that this is the toy tiger because of the conductive shape formed by the base of the toy tiger. The touchscreen device might then have an audio output saying "This is a tiger!" or playing a song about a tiger or so forth. These conductive objects could be used on any touchscreen surface.

In still other instances a device of the present invention may include any one or a combination of motion detectors and/or motion sensors, either worn by the child or attached to the device, or both. The devices can be worn on the finger or fingers of the child to capture gestures, such as pointing and waving, made by the child. The sensors and/or motion detectors on the finger may be worn on the finger may be attached to or part of a ring, adjustable ring, glove or other device, or multiple versions thereof.

In other instances a device of the present invention may include a stylus with a conductive tip and/or the ability to write on touchscreen. The stylus may have the appropriate sensors, including motion sensors, one or more cameras, one or more RFID readers, one or more barcode scanners, one or more touchscreens. The input of the device may be multiple pointing objects, such as a plastic and/or metal wand or toy, with the appropriate inputs as set forth above.

A device of the present invention may include audio recording devices or audio receivers and/or microphones.

A device of the present invention may also include one or more remotes or remote-type devices with buttons that may accomplish the following: allow the child to input feelings (for example, including but not limited to by pressing a smiley face, sad face, scared face, bored face, hungry, thirsty, juice, water, milk, different types of snacks, dirty diaper, etc.); seek help (for example by pressing a button to call a parent or a first responder); move forward to the next page in a book or next screen in a digital book; move backward to the previous page in a book or previous screen in a digital book; a specialized remote such as a "What is this?" button, which the child could press when he or she would like to have an object identified or when he or she is pointing to something in a book or on a screen and/or looking at something in a book or on a screen and would like to have the image identified; an "again" or repeat button (to have the most recent statements or music repeated); a "Call Mom and Dad" button (to call or video-chat with Mom and Dad); a call for help button; a "hungry" button when the child would like to request a food; a "thirsty" button when the child would like to request a drink; a "sleepy" button when the child is getting sleepy, etc.

Buttons could also include a variety of buttons more specific to certain learning stages such as a "How many?" button or a "What color is this?" button and so forth. The buttons could be actual physical buttons in metal or plastic and/or they could be graphically represented buttons on a touchscreen on the device and/or they could be listed on a screen with physical buttons next to the descriptors on the screen. The buttons could contain graphics and/or images in lieu of text and/or they could contain text descriptors. As stated above with the remote these non-verbal methods of communicating with the child are very helpful because language learners may not yet be able to form the questions we use to communicate and learn and providing language learners with another means to communicate should make for a smoother, less frustrating educational experience for the child.

In some implementations, the remote could be an actual, physical remote such as is used for television that sends signals via LED (light emitting diode), in other implementations the remote could be a device with buttons that connects and/or sends signals via methods known in the art. In some implementations the remote can interact with other household devices or include a phone, video calling, or mobile phone capabilities.

By way of a further example, the following are several non-limiting examples of inputs for a child, including but not limited to an infant, a baby, a toddler, and children of varying ages. It may be understood that the inputs (and the relevant processing) might be different for a toddler or pre-school aged child:

a. Child vocalizes, points, holds something and waves it around
b. Child puts something in his or her mouth
c. Child kicks legs, waves arms, etc.
d. Child cries, or child cries for prolonged period of time, raising fear of dehydration or illness
e. Child giggles
f. Child has specific facial expression that is meaningful to the apparatus and to which the apparatus is programmed to process
g. Child has tone of voice that is meaningful to the apparatus and to which the apparatus is programmed to process
h. Child looks sleepy/looks like he she is getting fussy or sleepy
i. Child looks at something, especially for prolonged period of time
j. Child makes facial expression such as smiling
k. Child does something physical such as walking or dancing
l. Child brings the apparatus a book or toy and gives the book or toy to the apparatus
m. Child is sleeping
n. Smoke detected in area of child
o. Stranger detected in vicinity of child
p. Home alarm system detects breach The one or more program modules of the present invention process the input, alone or in combination with other inputs, so that a response may be determined. The processing steps can take many forms to assist in processing the inputs, including SLAM technology (simultaneous localization and mapping), object, voice, speech, and/or sound recognition, emotion recognition, gesture recognition, and/or eye gaze tracking (through algorithms, software, and other systems).

The processing can thus be configured in a manner known in the art to provide the appropriate response. For example, in the context of a child reading the book, the processing would account for the child's physical gestures (such as eye gaze and pointing), note where in the book the child was having difficulty (by way of determining the portion of the page of the book), and perhaps note a verbal input such as the word "What?" Those processing of the apparatus would take those inputs, determine from them an appropriate response, and then provide the response. In this example, the processing would note that the child is looking at a page of the book with a tiger and note facial expressions showing difficulty and frustration, and respond with the verbal output of "It's a tiger!"

The program modules thus allow interchangeability and adaptability for the device depending on many factors, including the user's age, the user's academic level or proficiency, the user's immediate environment, and the activity engaged in by the user, such as reading a book.

As will be understood by those skilled in the art, the exact program modules vary in their application. The modules may utilize any of the following, alone or in combination: simultaneous localization and mapping (SLAM) technology; object recognition software and/or object recognition algorithms and/or object recognition systems; voice recognition and/or speaker identification technology. The speech recognition may utilize known systems, such as speech to text technology, voice user interfaces, voice dialing (e.g. call Mom), domotic control of other devices, automatic speech recognition, end-to-end speech recognition, speech to text processing, speech search technology (i.e. to answer questions), and intelligent assistant technology.

The present invention may also include sound recognition and/or sound search and/or sound identification (e.g. identifying a bark of a dog or a child crying or the type of cry) technology and/or software and/or applications. The sound recognition may take different forms, such as music recognition and/or music search and/or music identification; the ability to recognize pitch, speed, and volume of speech as inputs to determine emotions of speaker (e.g. distress or happiness of child, or confusion/question in one-word statements by child "dog?" versus "dog!"); to ability to distinguish sounds such as an individual crying.

The modules of the present invention may accomplish, for example, processing to accomplish tasks such as: tracking software and/or tracking application to track the time the child is sleeping, playing, eating, etc. and to provide data to an application and/or software and/or alert system for parents and/or teachers and/or caregivers etc.; software to predict when child is most likely to be successful in learning, to get hungry, to need a nap; software to note patterns of behavior and growth of knowledge over time and to increase the level of the response and/or the level of the interaction with the child; interaction with other household devices such as sleep monitors and receive data from household devices such as sleep monitors; automatic content recognition technology and/or software and/or applications; the ability to identify what a child is doing in a live context (i.e. recognize that a child is jumping up and down or dancing); the ability to identify what a child is doing in a live context specifically the gestures the child is making (for example recognizing that a child is pointing or making the baby sign language sign for more food, etc.).

As will be understood by those skilled in the art, the exact output devices utilized by the present invention may vary. They may include auditory output, physical output, gesture output, visual output, and a sensory output such as a vibratory output.

The output device may also include a movable device that reacts to the operation of the program modules and physically moves. For example, the output device may constitute a mechanical arm that can point to words or pictures in a book or other items in the user's environment, or it may include animatronic eyes that move to catch the attention of the user and direct his or her gaze to something in the user's environment. The output device may also include a projector device that projects images or data for the user in the user's environment. For example, in some implementations the disclosure contains robotic elements such as robot "arms" and/or robotic "hands" and/or robotic "paws" (and/or flippers and/or zoomorphic appendages) that are controlled via step-motor and/or electric motor and/or hydraulic motor and/or pneumatic system after receiving a signal to move from computer or other device. In other implementations the movements of the robotic "arms" and/or robotic "hands" and/or robotic appendages are able to "point" and/or "wave" and/or signal using baby sign language and/or signal using other sign language. In still other implementations the device would be able to hold and manipulate objects, such as holding and turning the pages of a book.

With the outputs the present invention can perform multiple operations, such as, in the appropriate form, moving (walking, running, dancing), rocking, and make the appropriate audio inputs in conjunction with movement.

Gesture output may occur by multiple step, electric, hydraulic, pneumatic, or other systems that are known in the art.

Visual outputs may include one or more of the following: one or multiple projectors; a heads-up display; a hologram, especially a heads-up hologram; touchscreens; laser pointers and/or directed light sources; and video devices such as computers, televisions, and other devices.

Outputs would be dependent on the programming of the processing techniques. For example, possible outputs for the apparatus educating a baby may include:

a. Apparatus says something: Apparatus repeats child's vocalization but with proper grammar and pronunciation; Apparatus comments or narrates what the child is doing or feeling "You are happy" "You are walking"; Apparatus provides vocalization naming object and repeats this vocalization while pointing and looking, either looking at the object and then at the child or some combination of the two, or Apparatus asks child question such as: Asking the child to find a particular object such as a tiger or a block with the letter A; Asking child to find object of particular color or shape; or Asking child to find certain number of objects b. Apparatus does nothing c. Apparatus plays music d. Apparatus points/gestures e. Apparatus bot and child walk or sit in room. The bot will point and gesture and vocalize about different things in the room to teach vocabulary (with or without baby pointing first)

f. Apparatus picks up object and/or picks up and moves object g. Apparatus provides digital image or picture of a word and an object h. Apparatus draws either on digital or on physical paper, such as modeling drawing letters i. Apparatus reads physical book or digital book to child, while being observant and responsive to the child's interests j. Apparatus alerts first responders to emergency via phone, text, or some other system k. Apparatus alerts parents that child is crying, awake, hungry, etc.

l. Apparatus uses physical movement to model behavior or to play i.e. models behavior such as dancing, building with blocks, waving hello, pointing or plays with child i.e. build or play by stacking blocks or sorting objects by color or moving object as directed by child m. Apparatus sleeps/closes eyes n. Apparatus makes eye contact with child or other person.

The input, output, and one or more program modules may be connected by various means, or a combination thereof, including the following: direct cable connection, USB connection, Wi-Fi connection, Bluetooth connection, wireless connection, cellular connection, and similar devices.

The physical form of the method and apparatus of the present invention may also vary, and include common items such as a stuffed animal, a 'robot,' or simply an iPad device with an attachable, movable pointing device. In some implementations the disclosure contains a plastic and/or metal object and/or plastic or metal or wood figure and/or plastic or fabric or other material stuffed toy. In some implementations the plastic or metal object may contain a camera that may be able to stand alone and may be mounted or unmounted. For example, the plastic or metal object might be shaped like a magic wand with a star on the end or the plastic and/or metal casing might be shaped like a faux smart-phone or like a toy designed to look like a parent's smartphone in the same way that children's toy "keys" are designed to look like a parent's keys. In another example the plastic and/or metal device might be designed to look like a dog dish where the cameras are embedded around the rim facing the center while others face outwards. In another example the plastic or metal object might be a stuffed toy such as a teddy bear. In another example the plastic and/or metal object might be a plastic figurine such as a baby doll type of toy or action figure type of object. In some implementations the robot may contain one or multiple figures and/or "hands" and/or pointing object and/or objects and/or anthropomorphic figures and/or zoomorphic figures and/or robotic figures with parts that move via step-motor and/or electric motor and/or hydraulic motor and/or pneumatic system after receiving signal to move from computer, CPU, or other device. In some implementations the figures may include moving parts, such as "arms" that move to point in different directions such as pointing at a part of a book in front of the robot or at a toy in front of the robot that the child would like to have identified and discussed; the robot may also include moving parts such as moving "eyes" that move to "look" at a specific feature.

The device may be capable of being attached to various items, such as the sides of a play-pen, the back of a car seat, a stroller, or a safety car seat. It may thus be a stand-alone device, or one that can be readily attached to an item in the user's environment.

The inputs, outputs, and processing would change with the learning ability of the person who is using the device. For example, a toddler might have the same inputs to the device as the baby, but include the child reading to the bot, with the child's gaze tracking the words as he or she reads them; the child looking at the bot when he or she is stuck on a word; or the child struggling to make sense of the word or understand the word, with several attempts to pronounce the word. The output would then, based on the processing that is configured into the device, include: the bot being responsive to a child struggling to read by supplying word and also noting it in data as word to work on, possibly sending an end of day report to parents or teachers; the bot introducing rare or unusual vocabulary words through lessons (perhaps one per day in morning or throughout day); the bot alerting parents, the bot encouraging narrative development and storytelling, the bot preventing child from falling while learning to walk/run etc., or the bot engaging in play with a ball.

For a pre-school age child, the inputs and outputs would again change with the learning ability of the child, with inputs including talking about people who are not present, talking about the past or future, or sharing drawings. The outputs would include responses such as asking questions about stories or suggesting stories to tell in the future, ask decontextualized questions to engage the child in a discussion, or encouraging narrative or storytelling.

The following examples demonstrate the present invention in different embodiments and operations. The examples relate to a device that has various input and output devices, memory accessible by at least one processor, the memory storing data and/or one or more program modules (such as a gaze tracking module) executable by the processor, where the program modules, when executed by the processor, are capable of various actions. Nothing in these examples is meant to limit the scope of the invention.

Example: Child-Led Play

Figure 3:
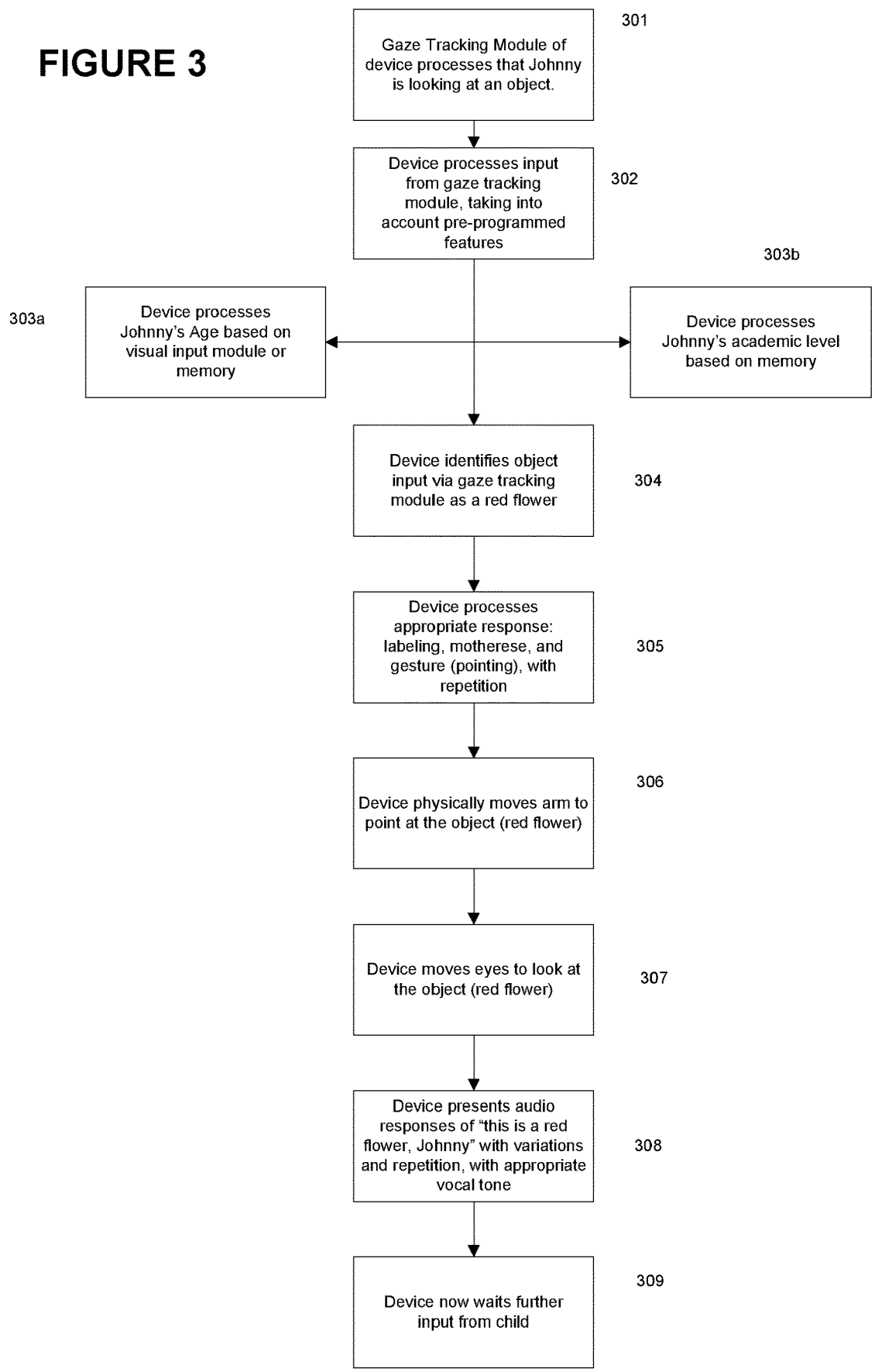
FIG. 3 is an example of operation of the present invention.

FIG. 3 sets forth the following operation of the present invention. This learning scenario involves Johnny, a six-month old baby, engaged in child-led play with the device configured as a robot. The robot is configured to be responsive to Johnny as Johnny looks around and points to different objects.

In step 301 a gaze tracking module of the device configured as a robot processes Johnny's gaze and determines that Johnny is looking at a particular object.

In step 302, the device configured as a robot processes the input from the gaze tracking module, taking into account other information stored in the memory of the device (such as the appropriate identification of various objects in the room).

In step 303a and 303b, the device configured as a robot processes Johnny's age or academic level. The device configured as a robot may process from information stored in memory that Johnny is six months old (via earlier input from a parent), may process from information stored in memory that Johnny is at an particular academic level, or the device configured as a robot may receive a video image of Johnny via a camera, and process that image to determine that Johnny has physical features appropriate to a six-month old child.

In step 304, the device configured as a robot identifies the object that Johnny is gazing at as a red flower.

In step 305, the device configured as a robot processes the inputs to determine an appropriate output: for a baby six months old, a proper response programmed for the apparatus might be labeling, use of "motherese," and gesture—particularly pointing, with repetition.

In step 306, the device configured as a robot provides an output by physically moving its arm (by appropriate electrical, mechanical, or other means) to point at the red flower.

In step 307, the device configured as a robot may provide an eye gaze output by moving the robots eyes to look at the flower in the room.

In step 308, the device configured as a robot provides the audio response via an audio module of "This is a red flower, Johnny." The response would be repeated, identically or with slight variations such as "Look Johnny, it's the red flower." The processing would also indicate that the verbal response is to be in a high-pitched, encouraging voice.

In step 309, the device configured as a robot would then await further input from the child, and continue to monitor the child, for example by a camera to determine Johnny's facial expression or body language for further processing.

Example: Device Responsive to Physical Inputs

Figure 4:
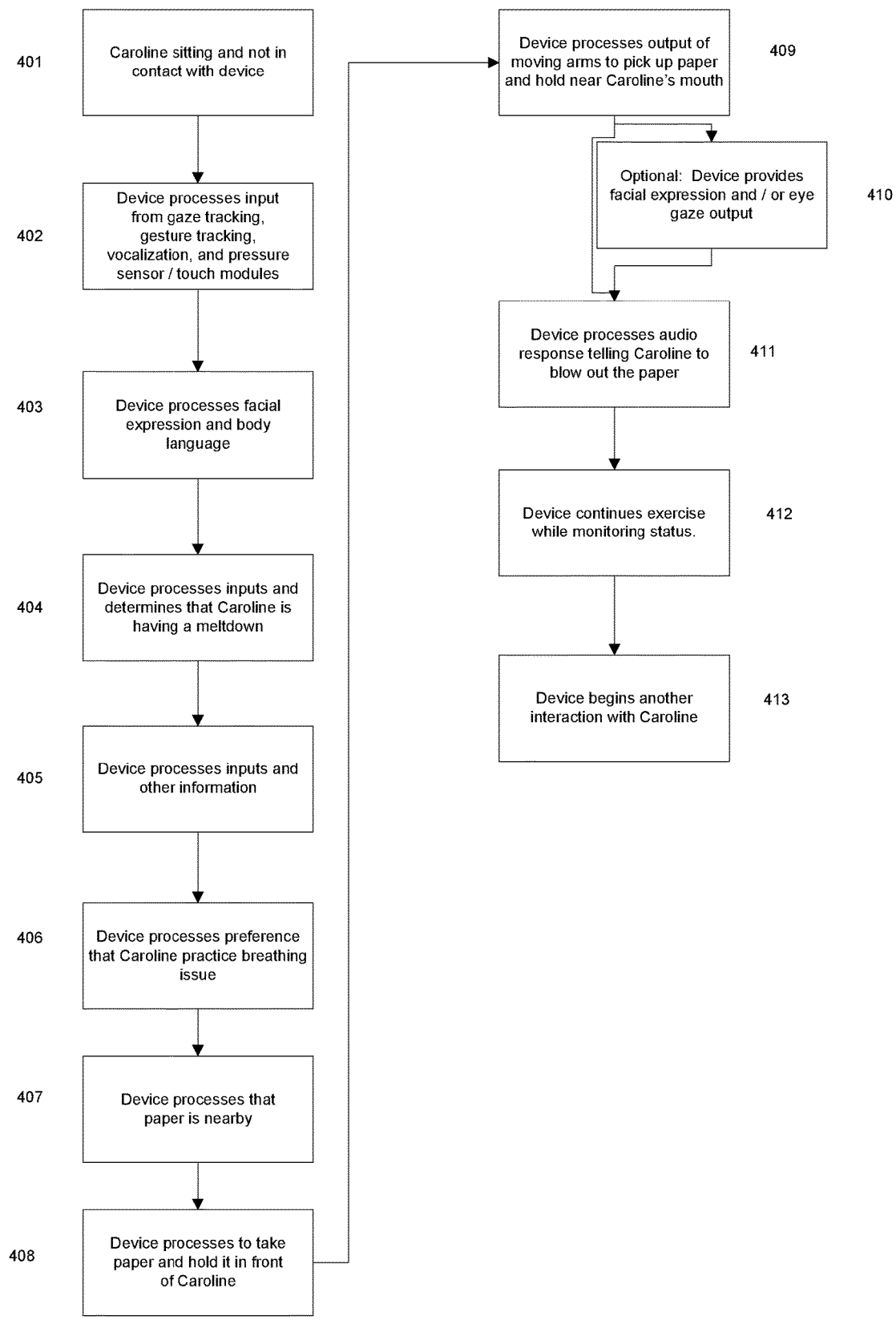
FIG. 4 is an example of operation of the present invention.

FIG. 4 sets forth the following operation of the present invention. This learning scenario involves Caroline, a three year-old, engaged in a meltdown with the device configured as a robot. The robot is configured to be responsive to Caroline and to help Caroline control her breathing and calm down. The robot has been configured to help Caroline calm down by using a breathing technique where Caroline will blow on a piece of paper until she is calm enough to talk about her feelings. This technique was selected by Caroline's parents and preschool teacher.

In step 401, the device configured as a robot processes that Caroline is sitting with her fists clenched, eyes shut tightly, screaming and crying, and that Caroline is not in contact with the robot. A person identification module of the device configured as a robot has already identified that this person is Caroline.

In step 402, a gaze tracking module of the device configured as a robot processes that Caroline's eyes are shut tight; a gesture tracking module of the device configured as a robot processes that Caroline's fists are clenched; a vocalization module of the device configured as a robot processes that Caroline is vocalizing by screaming and crying loudly; and a pressure sensor/touch sensor module of the device configured as a robot processes that Caroline is not in contact with the device configured as a robot.

In step 403, a facial expression module and body language module of the device configured as a robot processes that Caroline is distressed.

In step 404, the device configured as a robot processes the information and determines that Caroline is having a meltdown.

In step 405, the device configured as a robot processes the input from the gaze tracking module, the gesture tracking module, the vocalization tracking module, the pressure sensor/touch sensor module, the object identification and character identification modules, the facial expression and body language modules, and the data collection module taking into account other information stored in the memory of the device (such as Caroline's parents' preferences for social-emotional learning and recognition).

In step 406, a data collection module of the device configured as a robot, with the permission of Caroline's parents, processes the fact that Caroline's parents and teacher prefer to have Caroline practice a paper breathing exercise to calm down when she has a meltdown.

In step 407, an object recognition and character recognition module of the device configured as a robot processes that there is a piece of paper nearby.

In step 408, the device configured as a robot processes the best course of action to support Caroline is to take the nearby piece of paper, hold it in front of Caroline's mouth, and tell Caroline to blow, and to repeat this step until Caroline is calm enough to talk about her feelings.

In step 409, the device configured as a robot processes an output by physically moving its arm (by appropriate electrical, mechanical, or other means) to pick up the nearby piece of paper and to hold it in front of Caroline's mouth.

In step 410, the device configured as a robot may process an eye gaze output by moving the robot's eyes to look at Caroline.

In step 410, the device configured as a robot may process a facial expression output by moving the robot's facial muscles to look calm and serene.

In step 411, the device configured as a robot would process the audio response via an audio module of "Ok, Caroline, blow, blow, blow, blow, blow out the paper as hard as you can. Blow, blow, blow. Keep blowing Caroline." The processing would also indicate that the verbal response is to be in a calm and soothing voice.

In step 412, the device configured as a robot would continue to repeat the blowing exercise while monitoring Caroline's status for example by a camera to determine Caroline's vocalized response, as well as her facial expression or body language for further processing, as well as her eye gaze and gesture.

In step 413, When Caroline is calm enough the device configured as a robot would, for example, move on to helping Caroline discuss her feelings and what made her upset.

Example: Reading Assistance

Figure 5:
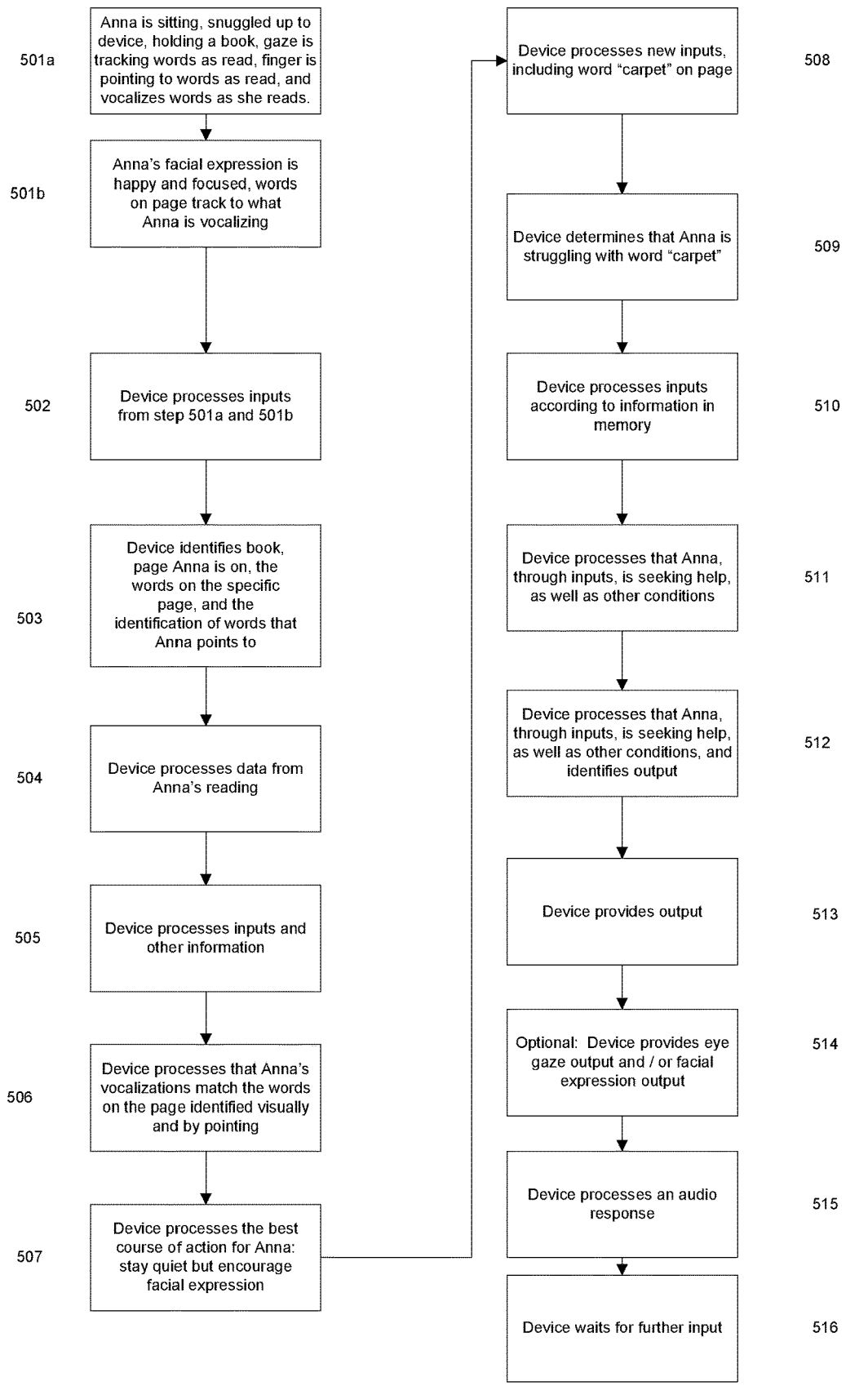
FIG. 5 is an example of operation of the present invention.

FIG. 5 sets forth the following operation of the present invention. This learning scenario involves Anna, a four year-old, engaged in reading with the device configured as a robot. The robot is configured to be responsive to Anna as Anna reads to the robot. The device configured as a robot is aware of Anna's reading level, words Anna struggles with, words Anna knows well, best practices from teachers for helping Anna as she practices reading, and also Anna's stamina in reading, specifically, that Anna can get tired or frustrated half-way through a book. The robot has been configured to respond to cues that Anna is struggling with a word and has also been configured to provide educator-researched support for Anna when she struggles.

In step 501a, the device configured as a robot determines that Anna is sitting, snuggled up to the robot and that Anna is holding a book, that Anna's gaze is tracking the words as she reads, that Anna's finger is pointing to the words as she reads, that Anna is vocalizing the words as she reads. In step 501b, Anna's facial expression is happy and focused, and that the words on this page of the book are "x" which tracks to what Anna is vocalizing, meaning Anna is reading correctly.

In step 502, a person identification module of the device configured as a robot has identified that the person is Anna. A gaze tracking module of the device configured as a robot processes that Anna is gazing and determines that Anna is looking at a book, and specifically that Anna's gaze is tracking as she reads. A gesture tracking module of the device configured as a robot processes Anna is pointing and determines that Anna is pointing at a book, and specifically that Anna's is pointing to each word as she reads. A vocalization module of the device configured as a robot processes that Anna is vocalizing and determines that Anna is vocalizing the words as she reads. A pressure sensor/touch sensor module of the device configured as a robot processes that Anna is snuggled up against the robot, cuddling the robot as she reads to her robot "friend." A facial expression module and body language module of the device configured as a robot processes that Anna has the facial expression typical to Anna, as an individual child, when she is happy and focused.

In step 503, an object recognition and character recognition module of the device configured as a robot has already identified that Anna is reading a specific book, what page she is on, what words are on this page, and also specifically identified each word as Anna points to it or gazes at it.

In step 504, a data collection module of the device configured as a robot processes Anna's reading speed, her confidence level with words in order to infer words she knows well and is struggling with, and will later use this data to prepare a message for her parents about which words Anna is excelling with and which words they should try to practice with Anna more often.

In step 505, the device configured as a robot processes the input from the gaze tracking module, the gesture tracking module, the vocalization tracking module, the pressure sensor/touch sensor module, the object identification and character identification modules, the facial expression and body language modules, and the data collection module taking into account other information stored in the memory of the device (such as the appropriate identification of the book, Anna's age, Anna's reading level, specific words Anna is still learning, specific words Anna knows well already, specific words Anna's teacher would like the bot to emphasize today, specific teaching techniques that work well for Anna).

In step 506, the device configured as a robot processes that Anna's vocalizations match the words on the page that Anna is looking at and pointing to.

In step 507, the device configured as a robot processes the best course of action to support Anna is to continue an encouraging facial expression but to stay quiet.

In step 508, a gaze tracking module of the device configured as a robot processes that Anna is now gazing up at the robot's "eyes." A gesture tracking module of the device configured as a robot processes that Anna's finger is resting on a particular word on the page, "carpet." A vocalization module of the device configured as a robot processes Anna has ceased vocalizing. A pressure sensor/touch sensor module of the device configured as a robot processes Anna is still snuggled up against the robot, cuddling the robot as she reads. A facial expression module and body language module of the device configured as a robot processes that Anna has the facial expression typical to Anna, as an individual child, when she is seeking help. A person identification module of the device configured as a robot has already identified that this person is Anna. An object recognition and character recognition module of the device configured as a robot has already identified that Anna is reading a specific book, what page she is on, and that the particular word that Anna's finger is resting on is the word "carpet."

In step 509, a data collection module of the device configured as a robot determines that Anna is struggling with the word "carpet."

In step 510, the device configured as a robot processes the input from the gaze tracking module, the gesture tracking module, the vocalization tracking module, the pressure sensor/touch sensor module, the object identification and character identification modules, the facial expression and body language modules, and the data collection module taking into account other information stored in the memory of the device (such as the appropriate identification of the book, Anna's age, Anna's reading level, specific words Anna is still learning, specific words Anna knows well already, specific words Anna's teacher would like the bot to emphasize today, specific teaching techniques that work well for Anna).

In step 511, the device configured as a robot processes that Anna is exhibiting the facial expression and behavior typical when a child learning to read wants an adult to help with a specific word. The device configured as a robot further processes based on past reading practice with Anna that this is the specific way that Anna, as an individual child, likes to ask for help. The device configured as a robot also processes from prior reading experience with Anna, or perhaps from inputs from Anna's parents or kindergarten teacher, that Anna does not know the word "carpet" by sight but that Anna does know her alphabet letters, the sounds that correspond to her alphabet letters, and that Anna knows the word "car" and the word "pet" but that Anna's parents and teachers want Anna to focus on sounding out new words phonetically. The device configured as a robot processes that Anna tends to get tired by the end of her reading but that because she is currently half-way through the book she should be alright with the energy and effort required to sound out a difficult word.

In step 512, the device configured as a robot processes the inputs and identifies the appropriate output: for Anna, an individual child, who knows her letters and their corresponding sounds and whose parents and teacher have configured the device to use the sounding out approach when Anna struggles with a word and have also asked the robot to make note of new words and to send an alert to the parents and teacher so that they can continue to practice the new word with Anna, within the context of processing that pointing, directed eye gaze, and a puzzled but encouraging facial expression help Anna. Therefore the appropriate output is to point and look at the word with an encouraging facial expression.

In step 513, the device configured as a robot provides an output by physically moving its arm (by appropriate electrical, mechanical, or other means) to point at the word "carpet."

In step 514, the device configured as a robot may process an eye gaze output by moving the robot's eyes to look at the word "carpet," or a facial expression output by moving the robot's facial muscles to look puzzled but encouraging.

In step 515, the device configured as a robot processes an audio response via an audio module of "Hmmm, that's a new word but I bet we can get better at reading it if we try! Should we try to sound it out together?"" The processing would also indicate that the verbal response is to be in a high-pitched, encouraging voice.

In step 516, the device configured as a robot would then wait further input from the child, and continue to monitor the child, for example by a camera to determine Anna's vocalized response, as well as her facial expression or body language for further processing, as well as her eye gaze and gesture.

Example: Foreign Language

Figure 6:
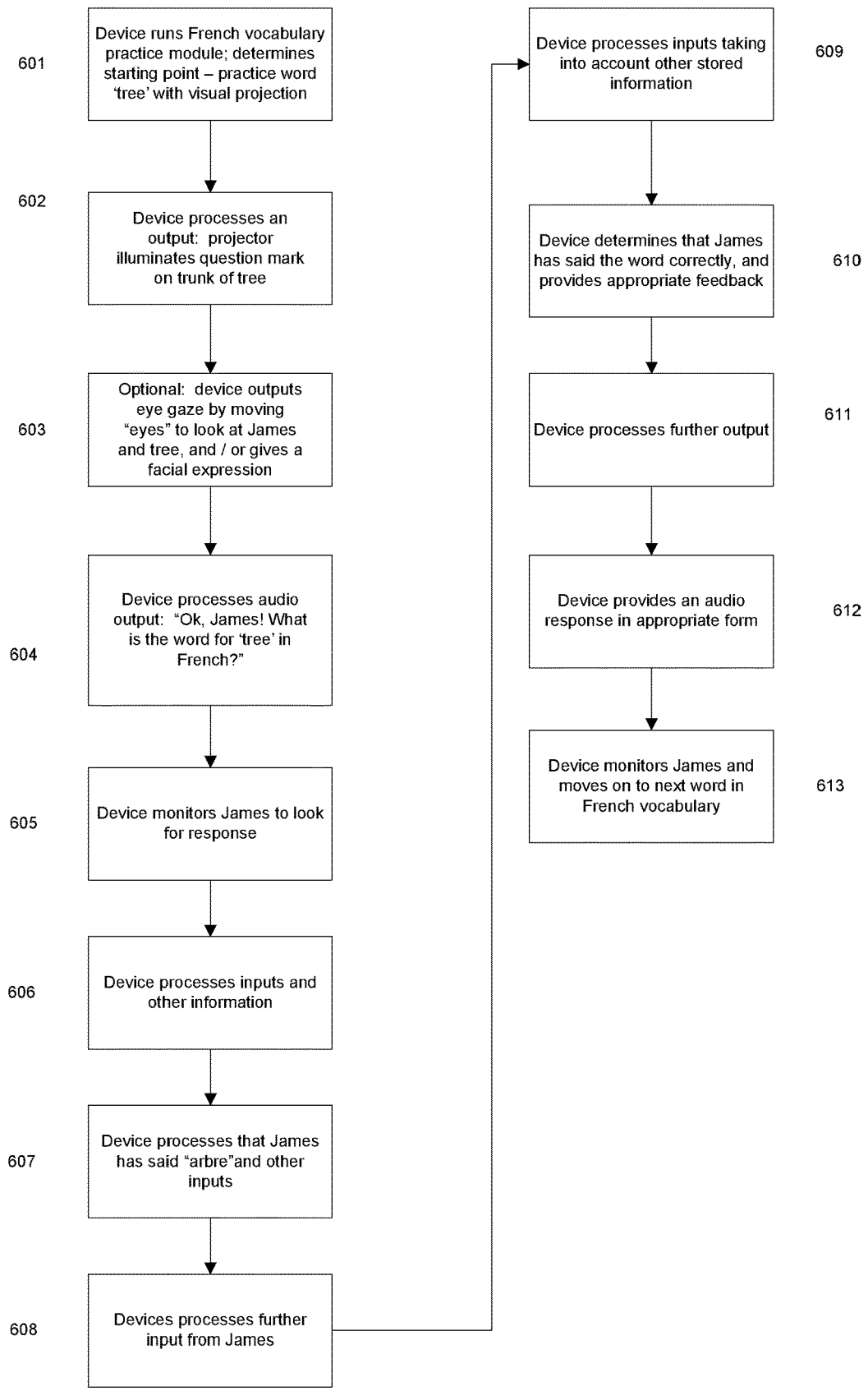
FIG. 6 is an example of operation of the present invention.

FIG. 6 sets forth the following operation of the present invention. This learning scenario involves James, a ten year-old, engaged in French language practice with the device configured as a robot. The robot is configured to help James practice a specific list of French vocabulary words which the robot processes James has been assigned for French homework. The device configured as a robot also processes from prior input from James' parents that James loves the outdoors and will get more out of his French practice if James is allowed to practice outside. The robot is configured to be responsive to James as he practices.

In step 601, the device configured as a robot begins to run the French vocabulary practice module created for James for his French vocabulary homework. The device processes the lesson plan module for the French vocabulary practice and determines that the output it should begin with is practicing the word "tree" by shining a question mark on a tree, looking at a tree, and vocalizing a question for James.

In step 602, the device configured as a robot processes an output by directing its projector (by appropriate electrical, mechanical, or other means) to illuminate a question mark on the trunk of a nearby tree, which would have been identified using object identification.

In step 603, the device configured as a robot may provide an eye gaze output by moving the robot's eyes to look at James and then to look at the tree, and/or may provide a facial expression output by moving the robot's facial muscles to look encouraging.

In step 604, the device configured as a robot would process an audio output via an audio module of "Ok, James! What is the word for 'tree' in French?" The processing may also determine that because James is ten-years old he will be most engaged in a lesson with the voice of his favorite super-hero and thus the robot would use the voice of James' favorite superhero in this lesson.

In step 605, the device configured as a robot would look for a response from James by monitoring for vocalizations, gesture, eye-gaze, facial expression, and so forth.

In step 606, a gaze tracking module of the device configured as a robot notices James is gazing at the tree and then at the bot; a gesture tracking module of the device configured as a robot notices that James is not gesturing; a pressure sensor/touch sensor module of the device configured as a robot notices that James is not touching the robot.

In step 607, a vocalization module of the device configured as a robot processes that James has said "arbre", and a facial expression module and body language module of the device configured as a robot processes that James has the facial expression typical to James, as an individual child, when he is happy and confident in his answer.

In step 608, an object recognition and character recognition module of the device configured as a robot has identified that the object James is looking at a tree. A data collection module processes that James has responded to the query in a quick manner and with no error.

In step 609, the device configured as a robot processes the input from the gaze tracking module, the gesture tracking module, the vocalization tracking module, the pressure sensor/touch sensor module, the object recognition and character recognition modules, the facial expression and body language modules, and the data collection module taking into account other information stored in the memory of the device (such as the words and pronunciation the French teacher would like James to use).

In step 610, the device configured as a robot processes that James's vocalizations match the correct vocabulary word and pronunciation for the word for tree in French. The device configured as a robot determines that the appropriate output is to provide positive feedback that James enjoys, in this case, a digital confetti image and a "hooray sound" as well as the word "arbre" is projected onto the tree trunk.

In step 611, the device configured as a robot provides an output by directing its projector (by appropriate electrical, mechanical, or other means) to project the image of the word "arbre" surrounded by exploding confetti on the trunk of the nearby tree, which would have been identified using object identification. The device configured as a robot may further provide an eye gaze output by moving the robot's eyes to look at James and then to look at the tree, and/or may provide a facial expression output by moving the robot's facial muscles to look happy.

In step 612, the device configured as a robot would provide the audio response via an audio module of "Correct!" The processing would also indicate that because James is ten-years old he will be most engaged in a lesson with the voice of his favorite super-hero and thus the robot would use the voice of James' favorite superhero in this lesson.

In step 613, the device configured as a robot continues to monitor James while moving on to the next word in the French vocabulary lesson plan module.

Example: Response to Baby Expressions

Figure 7:
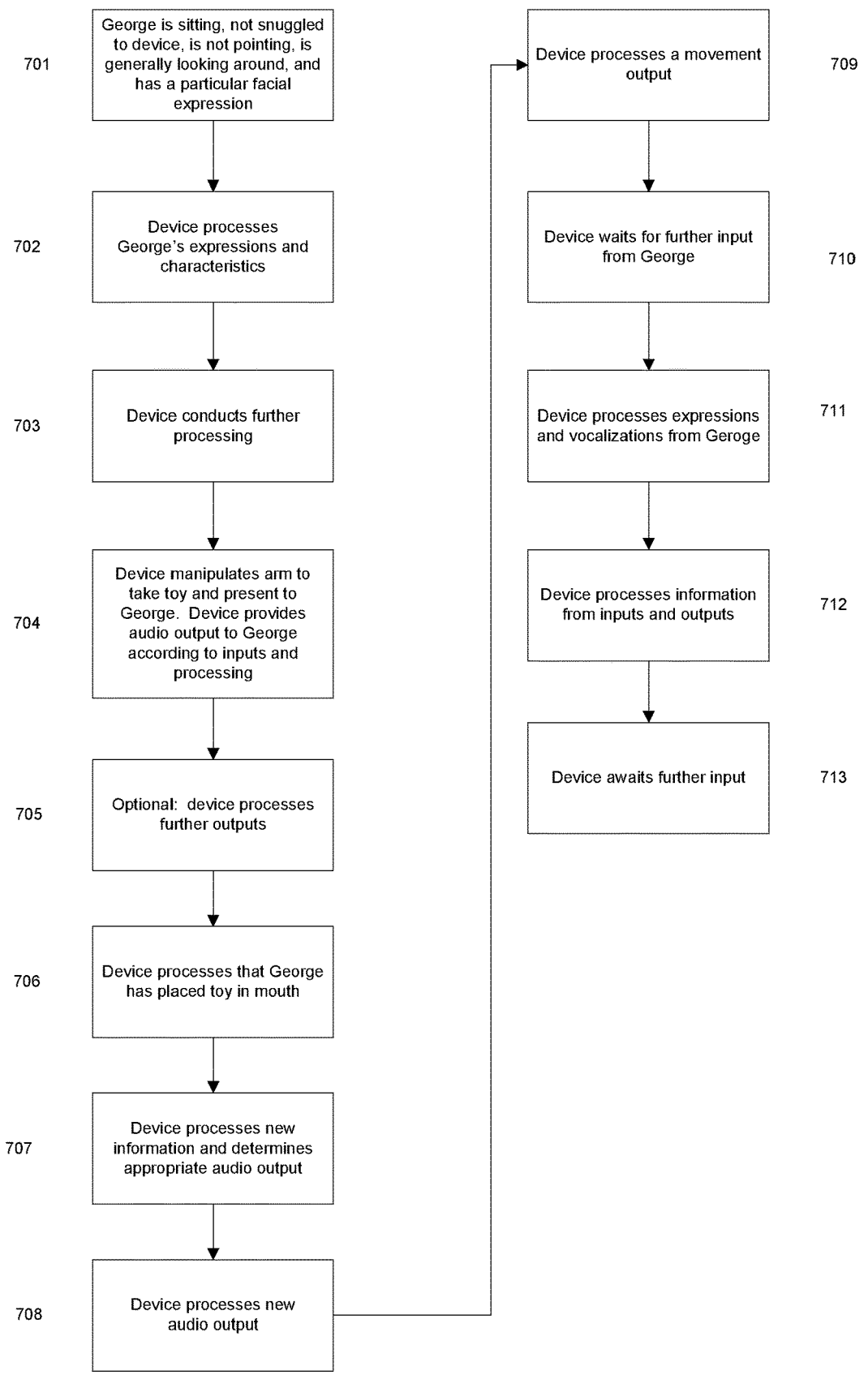
FIG. 7 is an example of operation of the present invention.

FIG. 7 sets forth the following operation of the present invention. This learning scenario involves George, an eighteen-month old, engaged in sitting but who is about to get fussy. The robot is configured to monitor George and to respond to his facial expressions to comfort and educate George. The device configured as a robot processes from prior interactions with George and his parents what different facial expressions mean for George, as an individual baby with individual signals that are specific to George. The robot also processes from input from George's parents, input from George's grandparents, past experiences with George, and best practices from early childhood experts, what works best for George and what is most comforting and productive for George, as a specific individual baby with experiences that are unique to George.

In step 701, the device configured as a robot processes that George is sitting, not snuggled up to the robot, that George's gaze is looking around generally, that George is not pointing, that George is not vocalizing, that George's facial expression has a particular quality that indicates he is about to start crying and about to get fussy, quickly. Particularly, a gaze tracking module of the device configured as a robot processes George is gazing around generally; a gesture tracking module of the device configured as a robot processes that George is not gesturing; a vocalization module of the device configured as a robot processes George is not vocalizing; a pressure sensor/touch sensor module of the device configured as a robot processes that George is not touching or in physical contact with the robot; and a facial expression module and body language module of the device configured as a robot processes that George has a look. From prior processing the device processes that George's facial features are associated with George's prior actions of being close to crying and getting fussy.

In step 702, a data collection module of the device configured as a robot processes George's expressions and other characteristics set forth in step 701, both to report to George's parents and, to provide an analysis over time of what might have caused George's discomfort for future prevention.

In step 703, the device configured as a robot processes the input from the gaze tracking module, the gesture tracking module, the vocalization tracking module, the pressure sensor/touch sensor module, the facial expression and body language modules, and the data collection module taking into account other information stored in the memory of the device, such as a prior processing of George's reactions and characteristics. The Processing Module processes, using the associated memory, that the look on George's face and his behavior at the moment means that George is about to start to cry or scream for attention. The device configured as a robot processes this from data from prior interactions with George and/or from input from George's parents themselves into the device's memory. The Processing Module also processes from its memory the following: that George is generally a fairly happy baby and therefore if the robot or a parent steps in quickly to provide entertainment, attention, education, or a combination of these things then George will not cry or scream; that without some sort of attention, entertainment, or education, George will start to scream and cry until he gets the attention and stimulation he desires; that this week, George's parents would like the robot to focus on farm animals as vocabulary words; that George is on target for an 18-month old and that teaching methods for an 18-month old will work well for George; that early childhood experts recommend a particular teaching method for 18-month olds as repetition, labeling, and gesture such as pointing or holding an object.

In step 704, the device then operates to manipulate a movable arm to take a small plastic cow out of the toy box and present it to George to educate him. In particular, the device configured as a robot provides an output by physically moving its arm and hand (by appropriate electrical, mechanical, or other means) to pick up a toy cow from the toy box, which it has identified through object recognition (or through other appropriate means such as the layout of the playroom and the location of objects from the device's memory). When George is holding the cow the robot will point to the cow and vocalize "It's the cow, George! The cow goes mooooo!" repeating for emphasis and optimal learning. In this way the device configured as a robot helps George avoid a meltdown and also teaches him new vocabulary words.

In step 705, the device configured as a robot may process an eye gaze output by moving the robot's eyes to look at the toy cow and then at George. The device may also process a facial expression output by moving the robot's facial muscles to look "ooooo" excited, perhaps with raised eyebrows and a circular "O" mouth shape typical of excited parents.

In step 706, the device configured as a robot continues to monitor George and processes that George has put the toy cow in George's mouth.

In step 707, the device configured as a robot processes this new information to determine that the appropriate vocalization audio output has changed from a commentary on the cow exclusively to a commentary on the fact that the cow is in George's mouth.

In step 708, the device configured as a robot processes the output of an audio response via an audio module of "Ooooooh George, you've got the cow in your mouth, George! It's the cow George! It's the cow! Does the cow go "mooooo" George? Yes, it does, George! The cow goes mooooooo. Does the cow go mooooooo?" The processing would also indicate that the verbal response is to be in a high-pitched, encouraging voice. The processing would also indicate that because George is 18 months old and is at the vocabulary learning point consistent with his age, that it is important at this stage of development to repeat vocabulary words and to point and gesture at the specific object being discussed and to use eye gaze directed at the object to optimize likelihood of learning new vocabulary.

In step 709, the device configured as a robot processes an output by physically moving its arm and hand (by appropriate electrical, mechanical, or other means) to point to the toy cow in George's mouth, and processes an output by physically moving its eyes (by appropriate electrical, mechanical, or other means) to look at the toy cow in George's mouth, consistent with best practices for this developmental stage of pointing and gesturing at objects to optimize vocabulary acquisition.

In step 710, the device configured as a robot processes to wait for further input from the child, and continue to monitor the child, for example by a camera to determine George's vocalized response, as well as his facial expression or body language for further processing, as well as his eye gaze and gesture.

In step 711, the device configured as a robot processes that George is now giggling and happy; a gaze tracking module of the device configured as a robot processes George is looking alternately at the cow in his mouth and at the robot; a gesture tracking module of the device configured as a robot processes that George holding and mouthing the toy cow; a pressure sensor/touch sensor module of the device configured as a robot processes George is not touching or in physical contact with the robot; and a facial expression module and body language module of the device configured as a robot processes that George is smiling broadly and happy.

In step 712, a data collection module of the device configured as a robot processes that George was made happy by the introduction of the toy cow and that George has had practice with the word "cow" and with the sound "mooooo." This vocabulary practice will, from prior programming in memory, be sent to his parents later this evening so that they can continue to play and practice with George and so that George's parents will know how his day went.

In step 713, the device configured as a robot would then wait for further input from the child, and continue to monitor the child, for example by a camera to determine George's vocalized response, as well as his facial expression or body language for further processing, as well as his eye gaze and gesture. At some point, the device configured as a robot will likely move on to a new activity such as a new toy/new vocabulary word or reading a book together, based on George's mood and input from George's parents about what they would like the device configured as a robot to focus on with George this week or even on this particular day, or based on a preset developmental plan from an early childhood expert that was selected by George's parents.

Example: Speech Interaction with a Child

Another important and advantageous feature of the present invention is the ability to at least receive one or more inputs (e.g., speech, vocalization, gesture, object, images of environment) from and/or associated with a child, accurately recognize and interpret what and/or how the child is communicating or attempting to communicate, and respond appropriately with speech output, such as in a conversational format, which may be implemented or available in any of the above discussed examples above or as a stand-alone computing device, such as a tablet computer, a virtual assistant computing device, smartphone, etc., that interacts with the child in a sophisticated manner (as if, for example, the parent was interacting with the child). One of the numerous advantages of such interaction is that the child is able to learn vocabulary and develop speech and language skills through the numerous and progressive interactions with the computing device.

In one example, the computing device may determine the age range or the age or the skill level of the child prior to the interaction in order to access appropriate data and information that may be needed to more accurately decipher, interpret and/or determine communication, speech, vocalization in accordance with the various types of phonological processes from the child so as to intelligently respond and interact with that child.

In a further example, the computing device may be configured to receive one or more inputs from the child during an interaction session, a teaching session or otherwise. As described above, the input may be verbal (e.g., vocalizations, speech, babbling, sounds, pronunciations, etc.), and the verbal input may be coupled with input that may be visual (e.g., object recognition, child's interaction with a particular object, child's gesture).

In another example, the computing device performs processing on the input to determine and/or interpret, for instance, what and/or how the child is communicating or attempting to communicate based on various types of data or information. In one aspect, the analysis may be based on data or information relating to speech sound development norms based on age, articulation development based on age, and/or common phonological processes for children. In another aspect, the analysis may also be based on contextual data, such as time of day, location of the child, eating habits of the child, etc., and visual data, such as any object the child may be holding or interacting with or any other visual cues (e.g., objects or things in the environment). In an additional aspect, the analysis may further be based on observations of past speech and/or gesture interactions between the child and the child's parent. In a further aspect, the analysis may be based on learned past interactions that the computing device has had with the child. In yet a further aspect, the analysis may be based on data or information related to babbling, which may be the child's attempt at communication, but where the phonemes in the babbling are not necessarily meaningful. Taking at least all of the aforementioned data and/or information into consideration, the present invention can accurately interpret what the child is saying and output a speech response.

In a further example, the computing device outputs a speech response to the child's input in a sophisticated and highly interactive manner. In accordance with one aspect, the computing device may use motherese, emphasizing certain syllables, and using a high pitched voice and/or exaggerating since children tend to respond to that type of speech output. In accordance with another aspect, the speech output to the child may mimic parental speech and/or the particular nuances of the parent's style of speech. In accordance with yet a further aspect, the speech response by the computing device can focus on certain words or phrases that the child is learning and has used in past interactions, including, for example, words or sounds that the parent believes the child should be learning, or focusing on or that an educational program would suggest for the child, so as to advance the education of the child. In that way, the speech response by the computing device can be interactive, adaptive, and educational.

Figure 8:
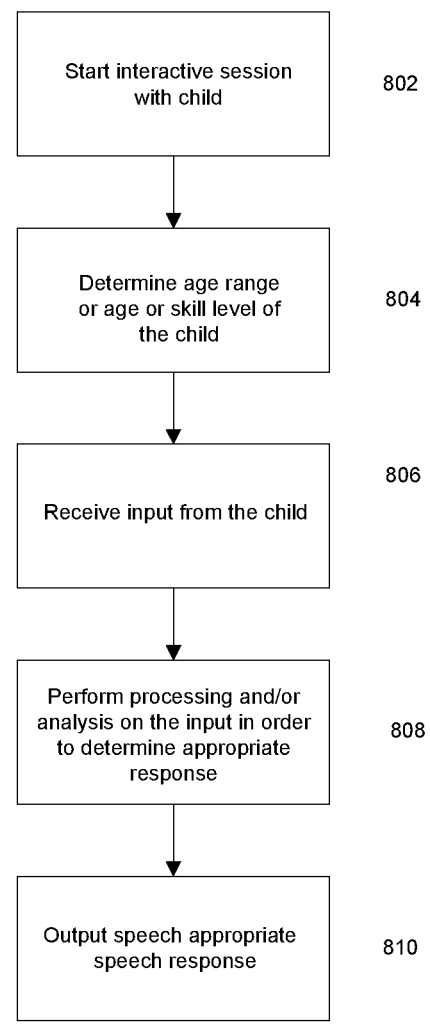
FIG. 8 is an example of operation of the present invention.

FIG. 8 is a flow chart that illustrates an example embodiment of speech interaction with a child in accordance with one or more aspects of the present invention. It is understood that the embodiment of FIG. 8 may be performed by one or more computing devices, such as the device discussed above with respect to the examples illustrated in FIGS. 1 to 7, or may be a separate computing device, such as a mobile computer, tablet computer (e.g., Kindle Paperwhite, Amazon Fire, Android tablets), smartphone, laptop, wearable computer, virtual assistant computing device, or any computing device that may be mounted or integrated with toys, play pens, and/or used in learning centers, etc. It may also be understood that the steps illustrated in the flow chart of FIG. 8 below is not limited to a particular order or sequence, and further, it is understood that any one of the one or more steps in FIG. 8 or otherwise may be performed simultaneously.

In step 802, the computing device may be constantly determining or identifying, using a microphone and/or at least one camera, whether or not an interactive session with a child is to be started. For example, a parent may verbally instruct the computing device to start the interactive session by saying "start learning session," or alternatively and/or additionally, the computing device may "listen" using the microphone and/or "see" using the at least one camera that a child is nearby or close to the computing device and may subsequently start the interaction session.

When it is determined that the interactive session has begun, in step 804, the computing device may determine an approximate age range of the child or determines the exact age of the child. This information can originate directly from the parent (by way of direct input into the computing device or otherwise), can be based on existing data or acquired real-time data, and/or can be based on the skill level of child. For example, the parent can input into the computing device that the child is three years old. Or, in other example, the child's age may be determined from existing Internet data (e.g., parent's purchase history of food, clothes, and diapers on an Internet-based retailer) or real-time data, such as image analysis of the child and comparing the analyzed images to images of children of comparable age. As described below, the parent or user of the computing device may have full control over how and when the existing Internet data may be accessed. Moreover, the skill level of the child may be assessed by the computing device (e.g., intellectual age opposed to physical age). Determining the age range or age of the child is helpful in interpreting the speech of the child.

Moreover, additional information about the child may be determined in order to enhance the interactive session between the computing device and the child. For example, the computing device may determine that the child resides in a certain region of a country in which particular slang or unique pronunciations of certain words are used compared to different regions of the country (e.g., the word "blanket" may be commonly referred to "baba" in southern regions of the United States). The location may be identified based on location-based information generated by the computing device itself or received from third-party services over a network. Additionally, the parent may input into the computing device the region they would like to use as an option.

In step 806, the computing device receives one or more inputs associated with the child or directly from the child. The input(s) may be verbal or visual, or both, and may be received individually one at a time or simultaneously (if more than one input). For example, the computing device may receive speech input from the child when the child says "wa-wa" (referring to "water"). In the same context, the computing device may also receive as an input the child's gesture, for example, the child points at a body of water during an outing with the parent, such as a lake, and says "wa-wa" (which may be useful when processing how to best respond to the child during the interactive session). Moreover, the computing device may further receive as input various objects that the child may be interacting with, such as a toy or a stuffed animal. For example, if the child is holding a stuffed lion and says "grrrr" (referring to the sound a lion makes), the computing device may receive at least two different inputs: the verbal input of "grrrr" and the object input of the stuffed lion. In at least that regard, the one or more inputs received by the computing device is not limited to just verbal inputs, but the computing device may also use gesture, object, and/or image recognition as further inputs to better determine an appropriate response to those one or more inputs, especially the verbal input.

Upon receiving the one or more inputs at step 806, the computing device performs processing and/or analysis on the input(s). The analysis may be based on numerous and various types of data and/or information, such as but not limited to: (i) speech sound development norms based on age, articulation development based on age, and/or common phonological processes for children (and common speech error that children typically make at different ages), (ii) learned speech interaction between child and parent, (iii) learned speech interaction between the computing device and the child, (iv) babbling recognition, all of which may be coupled with gesture, object, image, and/or contextual recognition in relation to the vocalization or speech uttered by the child. It is understood that the above data and/or information may be locally stored in memory of the computing device itself or may be obtained from other computing devices or storage devices over a network. Moreover, it is understood that the data, information, and/or knowledge with respect to common speech and sound errors may change over time, for example, due to new data that the computing device learns over time with the user (parent and/or child), or new data that makes the old data more precise, or any other changes in academia that increase the overall accuracy of determining what the child or user is attempting to communicate to the computing device. In at least that regard, the above-described data or information can constantly change and evolve, and the computing device updates and stores these changes.

In one example, the computing device may compare a received speech input from the child to data or information relating to common sound development norms (or common sound errors) based on the determined age range or age of the child in step 804. Referring back to the above example of the child saying "wa-wa," the child's phonetic pronunciation the word is incorrect. In that instance, the computing device may refer and compare to data/information that indicates that children in the age range of the child commonly pronounce "water" or any associated sounds as "wa-wa" or similar sounds, and accounts for such when formulating a response. As such, even though the child said "wa-wa," the computing device can easily interpret the child's speech input as "water," and output for example a speech response to say "Would you like some wa-ter?"

Below is a chart detailing individual speech sounds and the average range of mastery (in years):

| Individual Speech Sound | Average Range of Mastery in Years |
|---|---|
| p | 2-3 |
| m | 2-3 |
| h | 2-3 |
| n | 2-3 |
| w | 2-3 |
| b | 2-4 |
| k | 2-4 |
| g | 2-4 |
| d | 2-4 |
| t | 2-4 |
| ng | 2-5 |
| f | 3-4 |
| y | 3-5 |
| r | 3-6 |
| l | 3-6 |
| s | 3-6 |
| ch | 3-6 |
| sh | 3-6 |
| z | 3-7 |
| j | 4-7 |
| v | 4-6 |
| th (VL) | 5-7 |
| th (V) | 5-7 |

Moreover, the below chart shows various speech sound clusters and age of which 85 percent of children will master those sound clusters:

| Speech Sound Cluster | Age 85% of Children will Master |
|---|---|
| kw | 4 |
| bl | 5 |
| br | 6 |
| dr | 6 |
| fl | 6 |
| fr | 6 |
| gl | 6 |
| gr | 6 |
| kl | 6 |
| kr | 6 |
| pl | 6 |
| st | 6 |
| tr | 6 |
| sl | 7 |
| sp | 7 |
| sw | 7 |

Even further, developmental sequence to when children master speech sound productions are as follows in terms of early years, middle years, and late years: early—"m," "b," "y" "n," "w," "d," "p," "h"; middle—"t," "k," "g" "ng," "f," "v," "ch," "j"; and late—"sh," "s," "z," "l," "r," "th" (e.g., voiced and voiceless). If the child is two or three years old, it would not be expected for the child to accurately produce the "r" sound, for example. Typically, children produce the "w" for the "r" sound in "rabbit" or "gween" for "green" when they are toddlers or preschoolers. For an "r" sound at the end of the word, a young child may simply leave the sound off like "ca" for "car" or the child may attempt to produce it, but the sound may be distorted. These types of age appropriate errors may be referred to as developmental errors.

Furthermore, the below chart illustrates common phonological processes in children at various ages:

| Phonological Process | Definition | Examples | Age Eliminated By |
|---|---|---|---|
| Backing | Substitution of a sound produced in the front of the mouth, with a sound produced in the back of the mouth | "cop" for "top" "boke" for "boat" | Unknown |
| Fronting | Substitution of a sound produced in the back of the mount, with a sound produced in the front of the mouth | "doat" for "goat" "tandy" for "candy" "sip" for "ship" | 3-6 |
| Gliding | The substitution for a glide sound (w, y) for a liquid sound (l, r) | "pway" for "play" "wun" for "run" "yewo" for "yellow" | 5-0 |
| Stopping | Substitution of a stop sound (b, p, t, d, k, g) for fricative (f, v, z, h, th, sh, and zh) or affricate sound (ch or j) | "tope" for "soap" "cat" for "catch" "puddle" for "puzzle" | /f/ and /s/ = 3-0 /v/ and /z/ = 3-6 Sh, ch, and j = 4-6 th = 5-0 |
| Vowelization or Vocalization | Substitution of a vowel sound for a liquid sound | "Hay-uh" for "hair" "peopo" for "people" | Unknown |
| Cluster Reduction | Reduction of consonant cluster to a single sound | "tuck" for "truck" "sool" for "school" | 4-0 |
| Final Consonant Deletion | Deletion of the final sound (consonant) in a word | "cuh" for "cup" "dah" for "dog" | 3-0 |

-continued

| Phonological Process | Definition | Examples | Age Eliminated By |
|---|---|---|---|
| Initial Consonant Deletion | Deletion of the initial sound (consonant) in a word | "up" for "cup" "uv" for "love" | Unknown |
| Unstressed Syllable Deletion | Deletion of an unstressed syllable | "puter" for "computer" "nana" for "banana" | 4-0 |
| Assimilation (Harmony) | Refers to when a sound starts to sound like a surrounding sound | "beb" for "bed" "gank" for "thank" | 3-9 |
| Coalescence | Substitution of a phoneme that is different from the two adjacent phonemes yet takes on features of the target | "foke" for "smoke" "lath" for "last" | Unknown |
| Voicing or Devoicing | Voicing: substitution of a voiced consonant for an unvoiced consonant Devoicing: opposite of voicing | "gup" for "cup" "back" for "bag" | 3-0 |
| Reduplication | Repetition of a complete or incomplete syllable | "wawa" for water "baba" for bottle | 3-0 |

To that end, the above data and/or information related to speech sound development norms based on age, articulation development based on age, and/or common phonological processes for children (and/or common speech error that children typically make at different ages) may be used by the computing device to accurately interpret what the child is saying. In other words, the computing device runs the child's speech against common speech errors and other types of common speech tendencies. It may be understood that other child speech-language studies may be used to process and analyze interactions with children.

In another example, the computing device may observe an interaction between a parent and a child, and subsequently associate and record various verbal sounds that the child utters and the correct word associated with those sounds. By way of example, the computing device may observe using the microphone and at least one camera that the child picks up a toy dog and signals to the parent. The parent may respond by saying "yay, you got the dog." Then the child may respond by saying "duh" (referring to the dog). The computing device may analyze this interaction and match the utterance of "duh" as "dog" for future reference and callback when analyzing the child's speech in later interactive sessions. This analysis, in a different example, performed by the computing device may be based solely by the speech interaction between the parent and child and linking the parent saying something to the child repeating it. Thus, the visuals provided by the camera may be an extra clue.

In this example, there may be at least four clues that "duh" refers to "dog," such as a grammatical clue (may be from the child or from the parent, for instance, when the parent says "it is the dog"), a gesture clue (the child is holding the object and pointing to it), parental verbal clue (certain vocal emphasis and tone change when saying what the object is), and a repetition clue (the child will typically repeat the word after the parent has said it). Thus, if the child says "duh" in a verbal input at a later time, the computing device can determine that the input refers to "dog" based on the previously observed interaction between the child and the parent. This is advantageous in that a large repository of verbalizations, vocalizations, sounds, and pronunciations unique to the child may also exist.

In a similar example, the computing device may observe interactions that it has itself with the child, and subsequently associate and record various verbal sounds from the child to the correct words associated with those sounds. Referring back to the above example of the toy dog, the child may hold up the toy dog to the computing device (as opposed to the parent), and the computing device may respond, based on the child's gesture, by outputting a speech response, "It is a dog." Then, the child may attempt to respond and say "duh." At which point, the computing device will then respond by outputting "Yes, that is a dog," while associating the sound "duh" with "dog," in accordance with the observations that were just made. Similar to the above example, a large of amount of these sounds, vocalizations, and pronunciations unique to the child may be saved and stored for future recall.

It may be understood that the above examples may also apply in the context of non-noun words and sounds. Unique variations in the tone and pitch of the sound that a child might make may also be associated with a certain word. For example, a high-pitched and short "Ah-ii" may be associated with "hi." In that regard, the computing device in response, may say "Hi there!" or something similar in greeting.

In a further example, the computing device may be able to decipher and/or interpret babbling in a speech input by the child. For instance, the child may repeat one specific phoneme multiple times when babbling, such as, "da-da-da-da-da-da." The computing device may recognize these sounds as babbling and build up a database that includes all associated babbling sounds, including the "da-da-da-da-da-da" sounds. Therefore, the computing device may essentially "filter" out babbling sounds from speech input and interpret them as the child attempting to communicate, but the speech input does not contain any meaningful phonemes. The response, however, by the computing device to the babbling may be interactive and engaging for the child (and pretend that the babbling was communication and responding accordingly), rather than ignoring the babbling. For example, the computing device may respond "Oh my goodness, are we having a conversation? Yes, I think we are! I think we are chatting! Are you chatting with me?" In that way, the computing device can still utilize nonsensical words or sounds as an integral part of the interactive session with the child.

Furthermore, as part of the processing and/or analyzing step (step 808) of the one or more inputs from the child, the computing device may also be configured to analyze various non-verbal inputs to further interpret what the child is communicating. Referring again back to the above example of the child saying "wa-wa," in addition to the verbal input, the computing device may also receive a gesture input, such as the child pointing to a body of water (e.g., a pond, a lake). In this instance, the child may be "labeling" the term "wa-wa" with the body of water. Accordingly, the computing device may tailor and output a response in accordance with the labeling, for example, the computing device may respond "The wa-ter is in the pond. Fish live in the water."

In a different example, the child may point to a cup of water sitting on a coffee table in the living room and say "wa-wa." In this example, the gesture input of pointing to a cup gives the computing device at least some context that the child may be thirsty, and thus, the computing device may respond with an appropriate response, such as "Are you thirsty? Would you like some wa-ter?" This may also be verified using other contextual information about the child that may be input by the parent or acquired and recorded by the computing device over time, such as information related to when did the child eats or drinks, the different times of the day when the child hungry or thirsty, etc.

The contextual data is based on the premise that children and their behavior can be predictable (e.g., they cry when they want something, their eyes get droopy when they are tired or want to sleep, etc.). As such, contextual data (received as visual input via the at least one camera or otherwise) in conjunction with gesture input along with the verbal input by the child can all be used to accurately interpret and determine what the child is saying or communicating.

After the processing and/or analyzing at step 808 and having sufficiently and accurately interpreted what the child is saying and/or communicating based at least in part on the various data and information discussed above (or simultaneously during the processing or analyzing), the computing device may output an appropriate speech response at step 810. The speech response may be output in various forms. In one example, the response to the child may be in motherese, which may be a high-pitched, cooing speech that may include the repetition and hyper-articulation, as discussed above. Motherese may also contain exaggerated syllables and typically encouraging in tone. Thus, when the computing device recognizes that it is communicating with a child, it is beneficial to communicate with the child in motherese. It may be understood that the computing device over time may continue to use motherese or stop using motherese with the child based on the age range or age of the child. And in a further example, when the computing device switches its conversation from a child to a parent, the computing device will determine that it will no longer use motherese to communicate with the user.

Moreover, in step 810, the speech response to the child may alternatively be in a character voice. Typically, character voices tend to be high-pitched and children respond well to it, such as the high-pitched or falsetto voice of Elmo the Muppet character on the children's television show Sesame Street. Another example of the speech response at step 810 may be to mimic the parent's style of speech, which may be unique to that parent in cadence, tone, inflection, etc.

Another important aspect of learning a language for children is "labeling and repetition," which entails repeating a particular word (that could be a label for a certain object) various times throughout a period of time.

The speech response output at step 810 may also be tailored to repeat certain words that the child has been learning throughout the day. For example, if the child has been learning the word "tiger" with a person other than the parent in the morning, the word "tiger" can be output in response in the interactive session as many times as needed later in the day to reinforce the "labeling and repetition" learning method. This may be advantageous when the parent does not know in detail what words the child has been learning with a nanny or a teacher earlier in the day. To at least that end, the parent may request the computing device to recall the specific words that the child has been learning to continue to repeat them to the child during the interactive session when the parent is at home with the child and/or the computing device may automatically know to naturally interweave those words into its conversations with the child throughout the day.

Feedback (including verbal feedback, auditory feedback, vocal feedback, or any other sound feedback, and/or visual feedback, facial expression feedback, gesture feedback, or emotion feedback) from the child may be used to determine whether the speech response was correct or not. For example, if the child repeats one or more particular words in the speech response output at step 810, it may be indicative that the computing device has interpreted the child correctly (which is contrasted to adult feedback, where if an adult repeats one or more of the words in the response to the computing device, it may indicate that the response was incorrect). Gesture feedback may also be analyzed by the computing device along with verbal feedback and other types of feedback to determine the accuracy of interpretation of the child's communication and response. For instance, if the child giggles and repeats one or more particular words in the response, then that may indicate the computing device has interpreted the child correctly. In a different instance, if the child cries or otherwise looks visibly frustrated, then that may indicate that the child has not been interpreted correctly. As such, the feedback process may be used by the computing device to correct its interpretation of the child based on verbal and/or visual feedback from the child.

In any of the steps described above for FIG. 8 or for any other aspects or examples thereof, it may be understood that the child's parent may have full control over various settings. For example, the parent may block or filter out certain vocabulary, such as "wa-wa" or "ba-ba," if, for example, the child has "grown-out" of those sounds, or for any other reason that the parent deems fit. Settings related to different styles of education (e.g., Montessori education) for the child for the interactive session may be available and set by the parent. These different education styles may be programmed in the computed device. In any case, the parent will always have full control over the settings of the computing device related to at least the speech interactions with the child.

In the example(s) described above with respect to FIG. 8 (and other applicable examples), it may be understood that the computing device (or a plurality of computing devices connected via a network), by way of machine learning, from a large data set (the data of which may be collected and trained over time) can create a one-to-to match between a child's attempted speech and what the child is actually saying. Upon creating these one-to-one matches, a data set of these one-to-one matches can be created and be used to create one or multiple overall speech recognition data sets (e.g., different data sets can contain different data, such as languages, countries, regions, etc.) for children (and/or unique to the child the computing device is communicating with). Alternatively, the overall speech recognition data set may also be used to teach other machines to correctly interpret the speech of babies, toddlers, and/or children of varying ages.

Moreover, with respect to the above-described example(s), the present invention can also be used or implemented in other various settings. For example, the invention can be applied to a robotic live-in tutor. Moreover, the invention can be implemented in a preschool or a tutoring academy of children of particular ages. Users may able to subscribe to such services.

Interactive and sophisticated voice and/or speech interaction with children is beneficial and advantageous in numerous ways, as set forth above. The computing device can account for various mistakes made by a child when speaking to the computing device, and despite those mistakes, the computing device may accurately interpret and appropriately respond to the child. The computing device may access numerous data and information to further interpret verbal input from the child using contextual analysis. Moreover, it is possible that the computing device can be integrated into a network computing devices, all of which can have access to the same information to provide the child seamless speech interaction wherever the child goes, whether it would be from home to school or from daycare to the playground, etc. While the examples above have been described in the context of speech interaction with children, it may be understood that the present invention is applicable to and used for examples with stroke patients or any other users that may verbalize to the computing device with common speaking errors (e.g., common post-stroke errors), and the computing device would be able to interpret verbal input (along with other inputs, such as gesture input and object input) to communicate with children and/or adults with speech developmental issues, etc.

When referring to the term "verbal," it is to be understood that the term is broad and not limiting and can be anything related to sound, for example, it includes anything that is auditory, vocal, etc.

In accordance with one or more aspects, examples, and embodiments of the present invention, other examples may include:

Receiving audio of the child reading and comparing it to the text the child should be reading (the text on the screen or page or the text the child is looking at) and providing a response as appropriate.

Receiving audio of the child speaking and comparing it to the object the child is looking at or gesturing to and providing a response as appropriate.

Providing auditory and/or gestural response to the areas of interest to the child and/or that are part of a pre-determined lesson, and/or that are helpful to the child.

Providing auditory and/or gestural response that is leveled based on the child's ability which is determined through input through an application in one or multiple computers and/or tablets and/or mobile devices and/or robots and/or smartwatches and/or other home devices.

Providing auditory and/or gestural response that is leveled based on the child's ability as determined by machine learning based on previous interaction with the child in comparison with benchmark abilities and/or other children's abilities.

Providing auditory and/or gestural response that is leveled based on a level button or dial on one or multiple remotes and/or computers and/or tablets and/or mobile devices and/or robots and/or smartwatches and/or other home devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof. Although the disclosure uses terminology and acronyms that may not be familiar to the layperson, those skilled in the art will be familiar with the terminology and acronyms used herein.

What is claimed is:

1. A computing device for speech interaction with a child, the computing device comprising:
    at least one camera;
    at least one microphone; and
    at least one processor for executing stored instructions to:
        determine an age range or age or skill level of the child,
        receive one or more inputs from the child via the at least one camera and/or the at least one microphone,
        interpret communication from the child using analysis on the one or more inputs based at least in part on the determined age range, age, or skill level of the child, and
        output a speech response to the child based on the interpreted communication,
        wherein said determining the age range, age, or skill level of the child is based on the received inputs,
        wherein the received one or more inputs includes an eye gaze of the child captured from at least one camera.

2. The computing device of claim 1, wherein the age range or the age or the skill level of the child is provided by a parent of the child.

3. The computing device of claim 1, wherein the age range or the age or the skill level of the child is determined based on real-time data acquired by the at least one camera and/or the at least one microphone and/or based on existing data associated with the child.

4. The computing device of claim 3, wherein the real-time data includes one or more images of the child and/or one or more sounds from the child, and the determination of the age range or the age of the child further includes analyzing the one or more images and/or the one or more sounds.

5. The computing device of claim 3, wherein the existing data includes purchase history of a plurality of items associated with the child.

6. The computing device of claim 1, wherein the one or more inputs from the child includes one or more of the following: (i) a verbal input and (ii) a visual input.

7. The computing device of claim 6, wherein the verbal input includes one or more of the following: (i) a sound input, (ii) a vocalization input, (iii) a pronunciation input, (iv) a speech input, (v) a word input, (vi) a phrase input, or (vii) babbling input.

8. The computing device of claim 6, wherein the visual input includes one or more of the following: (i) a gesture input, (ii) an object input, (iii) an emotional expression and (iv) facial movements.

9. The computing device of claim 1, wherein the analysis on the one or more inputs includes analysis of one or more of the following: (i) speech sound development information for children at varying ages, (ii) articulation development information for children at varying ages, (iii) common phonological processes for children at varying ages, and (iv) common speech or sound errors that children make at varying ages.

10. The computing device of claim 1, wherein the analysis on the one or more inputs includes analysis of learned speech interaction between the child and a parent of the child.

11. The computing device of claim 10, wherein the learned speech interaction includes: (i) prior association of a sound by the child and an object and/or (ii) pitch or tones associated with a sound unique to the child.

12. The computing device of claim 1, wherein the analysis on the one or more inputs includes analysis of learned speech interaction between the child and the computing device.

13. The computing device of claim 1, wherein the analysis on the one or more inputs includes identification of babbling by the child.

14. The computing device of claim 6, wherein the analysis on the one or more inputs includes contextual analysis on the verbal input and the visual input.

15. The computing device of claim 14, wherein the contextual analysis includes determining whether there is an association between the verbal input and the visual input.

16. The computing device of claim 1, wherein the speech response to the child is output in motherese.

17. The computing device of claim 1, wherein the speech response to the child is output in character voice.

18. The computing device of claim 1, wherein the speech response to the child is output to mimic voice and speech characteristics of a parent of the child.

19. A method for speech interaction with a child, the method comprising:

determining, by a computing device, an age range or age or skill level of the child;

receiving, by at least one camera and/or at least one microphone, one or more inputs from the child;

interpreting, by the computing device, communication from the child using analysis on the one or more inputs based at least in part on the determined age range, age, or skill level of the child; and outputting, by the computing device, a speech response to the child based on the interpreted communication, wherein said determining the age rage, age, or skill level of the child is based on the received inputs, wherein the received one or more inputs includes an eye gaze of the child captured from at least one camera.

20. A non-transitory computer readable medium storing executable instructions, the executable instructions when executed by at least one processor performs a method for speech interaction with a child, the method comprising:

determining an age range or age or skill level of the child;

receiving, by at least one camera and/or at least one microphone, one or more inputs from the child;

interpreting communication from the child using analysis on the one or more inputs based at least in part on the determined age range, age, or skill level of the child; and outputting a speech response to the child based on the interpreted communication;

wherein said determining the age range, age, or skill level of the child is based on the received inputs;

wherein the received one or more inputs includes an eye gaze of the child captured from at least one camera.

* * * * *